US008090673B2

(12) United States Patent
Evans

(10) Patent No.: US 8,090,673 B2
(45) Date of Patent: *Jan. 3, 2012

(54) SCORING CONTENT RECOMMENDATIONS FOR USER-SPECIFIED TOPICS VIA TRUST RATINGS

(75) Inventor: Matthew Reid Evans, Draper, UT (US)

(73) Assignee: Evree LLC, Draper, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/802,482

(22) Filed: Jun. 7, 2010

(65) Prior Publication Data

US 2010/0306194 A1     Dec. 2, 2010

Related U.S. Application Data

(63) Continuation of application No. 11/507,699, filed on Aug. 21, 2006, now Pat. No. 7,761,399.

(60) Provisional application No. 60/709,623, filed on Aug. 19, 2005.

(51) Int. Cl.
*G06F 17/00* (2006.01)
*G06N 7/00* (2006.01)
*G06N 7/08* (2006.01)

(52) U.S. Cl. .......................................... 706/55

(58) Field of Classification Search ........................ None
See application file for complete search history.

(56) References Cited

U.S. PATENT DOCUMENTS
2005/0256866 A1   11/2005   Lu et al.

OTHER PUBLICATIONS

O'Donovan, J. et al., Trust in Recommender Systems, in IUI '05: Proceedings of the 10th international conference on intelligent user interfaces, 2005 p. 167-174. ACM Press.
Massa, P. et al., Trust-aware Collaborative Filtering for Recommender Systems, LNCS 3290, pp. 492-508, 2004.
Zeigler et al. "Improving Recommendation Lists Through Topic Diversification," WWW May 10-14, 2005, pp. 22-32.
Wang et al. "Effective personalized recommendation system based on time-framed navigation clustering and association mining" Expert Systems w/ Applications 27(2004),pp. 365-377.
"U.S. Appl. No. 11/507,699 Notice of Allowance", Mar. 9, 2010 , 36 pages.
"U.S. Appl. No. 11/507,699 Office Action", Jul. 27, 2009 , 21 pages.

*Primary Examiner* — Jeffrey A Gaffin
*Assistant Examiner* — Li-Wu Chang
(74) *Attorney, Agent, or Firm* — Daniel L. Salgado, Esq.

(57) ABSTRACT

A recommendation network is described. In some embodiments, the recommendation network includes recommenders that explicitly or implicitly recommend, rate or refer items and recommendation receivers that receive the recommendations. In some embodiments, the recommenders can be recommendation receivers, and vice versa. In some embodiments, recommendation receivers assign rust ratings to recommenders. The recommendation receiver can assign separate trust ratings to individual topics for which the recommendation receiver trusts the recommender. The separate trust ratings represent the recommendation receiver's amount of trust in the recommender to makes valuable recommendations for the specific topic. The recommendation network can use the separate trust ratings, along with ratings provided by the recommender, to rank recommendations per the separate topics. The recommendation receiver can assign the recommender to different bundles, topics, channels, etc. to which other recommendation receivers can subscribe.

20 Claims, 16 Drawing Sheets

| BUNDLE | CONTENT | LEVEL 1 RATINGS | LEVEL 2 RATINGS | |
| --- | --- | --- | --- | --- |
| 148 | 101 | -2 | +4 | +2 |
|  | 105 | +3 | +6 | +10 |
| 149 | 105 | +3 | +6 |  |
|  | 106 | +1 | +6 |  |

FIG. 5

SCORING CONTENT RECOMMENDATIONS FOR USER-SPECIFIED TOPICS VIA TRUST RATINGS

RELATED APPLICATIONS

This application claims priority of U.S. patent application Ser. No. 11/507,699, filed Aug. 21, 2006 entitled "Recommendation Network," which claims priority benefit of U.S. Provisional Patent Application No. 60/709,623, entitled "Recommendation Network" filed Aug. 19, 2005, which applications are hereby incorporated by reference.

FIELD

The present invention relates generally to the field of networks and software and, more specifically, to methods and apparatus to make recommendations on a network.

BACKGROUND

Today there are many types of networks available, each with its own set of benefits and drawbacks. One major drawback of networks today is apparent when users of the network attempt to find relevant information on the network, especially given that some networks, such as the Internet, contain countless pieces of information that may or may not be relevant to the user. There is just so much information that the user finds it very difficult to sort through it all.

Some methods have been developed to assign value to information on a network to assist in finding relevant information. One method is a social network. In a social network, a first user of the network may make a recommendation regarding information, but only other users who have a personal knowledge of the first user have a pre-determined basis for considering the recommendation to be valuable or noteworthy based on the trust that they have in that person. All other users who have no personal knowledge of the first user have no basis for determining if the recommendation is valuable, or noteworthy. Therefore, those other users must spend the time to view the content, or simply ignore the recommendation before they can determine if it is valuable or noteworthy.

Furthermore, even those who have a personal knowledge of, and trust in, the first user still have a difficult time sifting through all of the recommendations from just their trusted friends and family, especially since the trusted friends and family may not necessarily be an expert judge of good content. Hence, there may be much better content beyond what is recommended by the circle of trust, but no way to really find it.

SUMMARY

A recommendation network is described. The recommendation network may include, but is not limited to, users or entities ("recommendation sources,") that explicitly or implicitly recommend, rate or refer items ("item" being anything that can be recommended, rated or referred, such as content, information, products, entities) and users or entities that receive recommendations or referrals ("recommendation receivers,"). Users who make recommendations can create multiple recommendation sources, using different recommendation sources for different purposes, by assigning different recommendations to different recommendation sources.

The recommendation network allows recommendation receiver to assign relative trust ratings to recommendation sources, the relative trust rating representing the recommendation receiver's confidence that the recommendation source, compared to other recommendation sources, makes recommendations the recommendation receiver considers valuable. The relative trust ratings can be ordinal or cardinal values that can be used by the network algorithm to filter and rank items for the recommendation receiver. The network ranks items for the recommendation receiver based on the number of recommendation source referencing the item and the relative trust rating the recommendation receiver has assigned to those recommendation sources.

By ranking items for each recommendation receiver according to the a ranking algorithm that uses the relative trust ratings the recommendation receiver has assigned to those recommendation source, the network allows the recommendation receiver to receive recommendations for items in the form of a ranked list, the items being ranked by the degree they are recommended by the recommendation receiver's trusted recommendation sources.

By allowing the recommendation receiver to assign relative trust ratings to different recommendation source, and by ranking and displaying recommendations by the degree to which they are recommended to the recommendation receiver, the network allows users to subscribe to, or receive, recommendations from a limitless number of recommendation sources without being overwhelmed. The network prioritizes the recommendations for a recommendation receiver by the parameters the recommendation receiver establishes, imposing order on a potentially-limitless number of pushed recommendations.

According to an embodiment of the invention, a recommendation receiver can be a recommendation source, and can create recommendation sources, for themselves or other recommendation receivers. The recommendation receiver may explicitly or implicitly recommend items as a recommendation source, and can also recommend other recommendation sources, or re-label other recommendation sources, or rate multiple recommendation sources and combine them, to create new recommendation sources. Besides combining multiple recommendation sources to create a new recommendation source, recommendation receivers can create new recommendation sources by restricting the new recommendation source to include only those recommendations, from one or more existing recommendation sources, that share or avoid particular characteristics. Thus, the recommendation receiver can interpret, or reinterpret, the recommendation source in their own way, which may be to explain, expound or elaborate on, editorialize about, clarify, recommend, label, combine, split-up and recombine in different ways, refine, organize, categorize, group, or in any other way use or interpret the recommendation source to create new recommendation sources that are meaningful to the recommendation receiver. The new recommendation sources may in turn be used by the recommendation receiver, or other recommendation receivers. Other recommendation receivers can assign relative trust values to the new recommendation sources. Therefore, by interpreting or reinterpreting received recommendation sources to create new recommendation sources, then by recommending those new recommendation sources, the recommendation receiver provides more information, which helps other recommendation receivers to identify valuable recommendations and information about items.

Other features, according to other embodiments of the present invention, will be apparent from the accompanying drawings and from the detailed description that follows.

BRIEF DESCRIPTION OF THE DRAWINGS

Embodiments of the present invention are illustrated by way of example and should not be limited by the figures ("FIG.") of the accompanying drawings in which like references indicate similar elements and in which:

FIG. 5 is a diagram of a recommendation network 500, configured according to an embodiment of the present invention.

DETAILED DESCRIPTION

Figure 1:
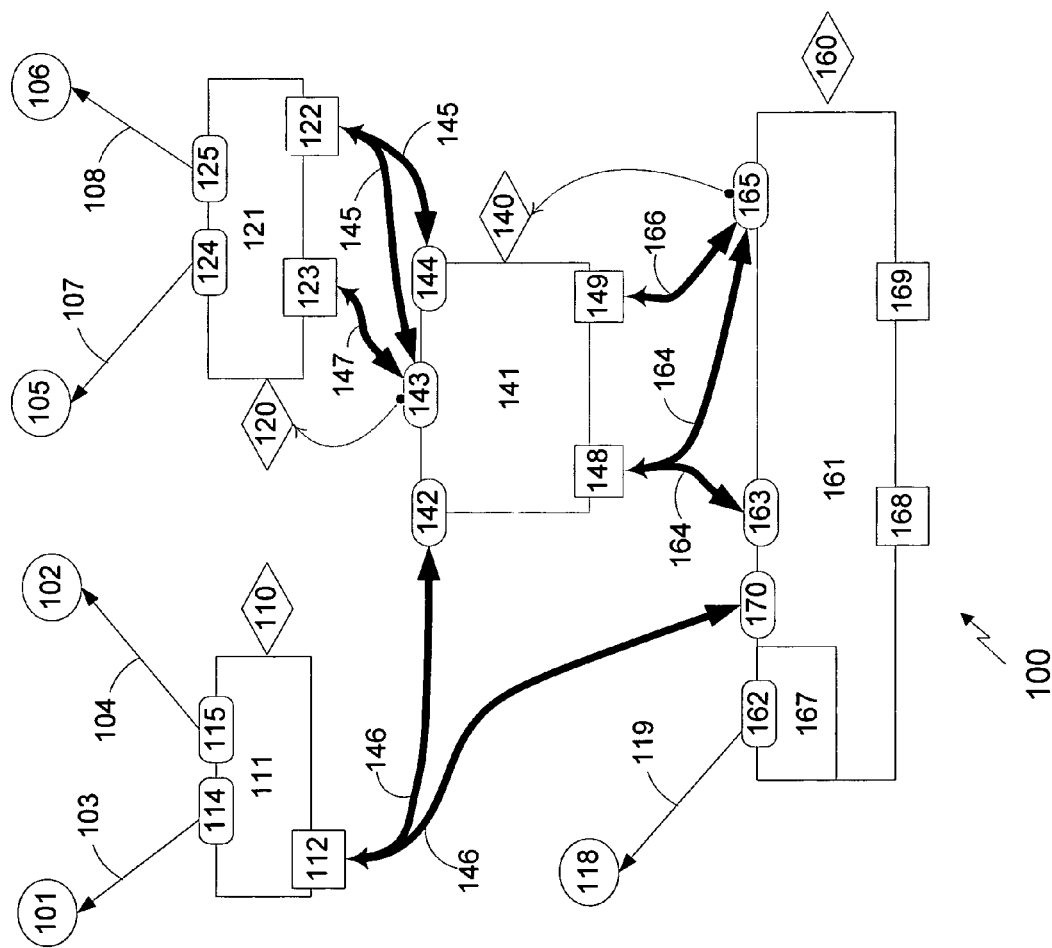
FIG. 1 is a diagram of a recommendation network 100, configured according to an embodiment of the present invention.

Described herein is a recommendation network. In the following description numerous specific details are set forth. One of ordinary skill in the art, however, will appreciate that these specific details are not necessary to practice embodiments of the invention. While certain exemplary embodiments of the invention are described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

Some portions of the detailed descriptions that follow may be presented in terms of algorithms and symbolic representations of operations on data bits within a computer memory. These algorithmic descriptions and representations are the means used by those ordinarily skilled in the data processing arts to most effectively convey the substance of their work to others ordinarily skilled in the art. An algorithm is here, and generally, conceived to be a self-consistent sequence of processing blocks leading to a desired result. The processing blocks are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required methods. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A recommendation network is described. The recommendation network may include, but is not limited to, users or entities ("recommendation sources,") that explicitly or implicitly recommend, rate or refer items ("item" being anything that can be recommended, rated or referred, such as content, information, products, entities) and users or entities that receive recommendations or referrals ("recommendation receivers,"). Users who make recommendations can create multiple recommendation sources, using different recommendation sources for different purposes, by assigning different recommendations to different recommendation sources.

The recommendation network allows recommendation receiver to assign relative trust ratings to recommendation sources, the relative trust rating representing the recommendation receiver's confidence that the recommendation source, compared to other recommendation sources, makes recommendations the recommendation receiver considers valuable. The relative trust ratings can be ordinal or cardinal values that can be used by the network algorithm to filter and rank items for the recommendation receiver. The network ranks items for the recommendation receiver based on the number of recommendation source referencing the item and the relative trust rating the recommendation receiver has assigned to those recommendation sources.

By ranking items for each recommendation receiver according to the number of recommendation source making the recommendation and the relative trust ratings the recommendation receiver has assigned to those recommendation source, the network allows the recommendation receiver to receive recommendations for items in the form of a ranked list, the items being ranked by the degree they are recommended by the recommendation receiver's trusted recommendation sources.

By allowing the recommendation receiver to assign relative trust ratings to different recommendation source, and by ranking and displaying recommendations by the degree to which they are recommended to the recommendation receiver, the network allows users to subscribe to limitless recommendation source without being overwhelmed. The network prioritizes the recommendations for an recommendation receiver by the parameters the recommendation receiver establishes, imposing order on a potentially-limitless number of pushed recommendations.

According to an embodiment of the invention, a recommendation receiver can be a recommendation source, and can create recommendation sources, for themselves or other recommendation receivers. The recommendation receiver may explicitly or implicitly recommend items as a recommendation source, and can also recommend other recommendation sources, or re-label other recommendation sources, or rate multiple recommendation sources and combine them, to create new recommendation sources. Besides combining multiple recommendation sources to create a new recommendation source, recommendation receivers can create new recommendation sources by restricting the new recommendation source to include only those recommendations, from one or more existing recommendation sources, that share or avoid particular characteristics. Thus, the recommendation receiver can interpret, or reinterpret, the recommendation source in their own way, which may be to explain, expound or elaborate on, editorialize about, clarify, recommend, label, combine, split-up and recombine in different ways, refine, organize, categorize, group, or in any other way use or interpret the recommendation source to create new recommendation sources that are meaningful to the recommendation receiver. The new recommendation sources may in turn be used by the recommendation receiver, or other recommendation receivers. Other recommendation receivers can assign relative trust values to the new recommendation sources. Therefore, by interpreting or reinterpreting received recommendation sources to create new recommendation sources, then by recommending those new recommendation sources, the recommendation receiver provides more information, which helps other recommendation receivers to identify valuable recommendations and information about items.

Herein, an entity or users may be referred to at some times as a recommendation source, at other times a recommender entity or recommender, and at other times as a recommendation receiver, and yet at other times as a bundler. This is because the same entity or user may function in all of those capacities. For example, the context may dictate a functional descriptor indicating that the user is capable of making a recommendation, and therefore may be called a "recommender". However, the sole term "recommender", in those contexts, should not preclude the capability of that user to receive recommendations as well, although a receiver user does not have to be a recommender user. Likewise, a user may be referred to solely as a recommendation "receiver" instead of a recommender, as the context may dictate a functional descriptor indicating that the user is capable of receiving a recommendation, or is to be utilized to receive a recommendation. However, the sole term "receiver", in those contexts, should not preclude the capability of that user to make recommendations as well, although a recommender user or entity does not have to be a receiver of recommendations. Furthermore, the recommendations sources, recommenders and recommender receivers may be described in conjunction with a device. However, it should be kept in mind that the entity or user and the device can function either in conjunction as a unit, or separately. Also, the user, or the device, can function either at similar times or at differing times.

FIG. 1 illustrates a recommendation network 100 according to an embodiment of the invention. The recommendation network 100 may be a computer network, either public, private, or any combination thereof, such as the Internet, a company or government intranet, or any a privately developed computer network. However, embodiments of the invention should not be restricted only to computer networks, as other embodiments of networks may pertain to other embodiments of the invention, including television networks, radio networks, or any other form of network where items may be referred or recommended. Referring to FIG. 1, the recommendation network 100 may include a recommendation source, such as a recommender entity ("recommender") 110. Recommender 110 may be any user or entity capable of making or conveying a recommendation or referral of "items". Items may be anything that can be recommended, rated or referred, such as content, information, products, entities, etc. In FIG. 1, some items are illustrated as content on the network 100, including content 101, 102, 105, 106, and 118. Furthermore, the recommender 110 can be an actual person, a group of people, or a device, such as a computer that can produce a recommendation.

Content 101, 102, 105, 106 and 118 may be any information that is available for access on a network. In one embodiment of the invention, the content 102 may be virtual or electronic content accessible by a computer through a computer network. For example, the content 102 may be webpage, a media file, a database, streaming data, an audio or video file, an RSS feed, metadata or any other object or data that can be stored in an electronic format, on a computer memory, or accessible through a computerized network. The content 102 may be a reference to a real life object, expressed on the network in an electronic format, such as a real estate or business listing, a notice of an upcoming social event, a critique of a public figure, etc. On the other hand, the content 102 may be a real-life (non-virtual, non-electronic) object, external to a computer network. For example, the content may be an actual place of business, an actual social gathering, an actual person, or other real-life object, that the recommender 110 recommends.

The recommender 110 may utilize a device 111 to make recommendations 103, 104 of one or more items, such as content 101 and 102 respectively. The recommendations 103, 104 may be explicit, or a direct, recommendation where the recommender is directly recommending the content for a particular topic. However, as will be shown later, the recommendations 103, 104 may be reinterpreted by a recommendation receiver (e.g., 140), who may assign the recommendations to a different topic, or somehow re-label or reorganize the recommendations to be understood or appreciated in a different light, from the perspective of the recommendation receiver 140, and re-recommended by the recommendation receiver 140. Thus, any recommendations 103, 104 from the recommender 110 may end up being implicit recommendations, or indirect recommendations, that have been re-cast by the recommendation receiver 140 as direct recommendations. In yet another embodiment of the invention, the recommendations 103, 104 can be a computational result derived through a plurality of criteria, data inputs, or formulaic variables set by the recommender 110, such as a web survey, a sports poll, or a rating system.

The recommendations 103, 104 may be combined, organized, or categorized into a recommendation source called a channel 112, or in other words a conglomeration of one or more recommendations. In one embodiment of the invention, the channel 112 may be labeled with, or assigned to, a topic to which the recommender 110 feels that content 101 and 102 are related. Consequently, in one embodiment of the invention, the channel 112 may be referred to as a topic channel. Furthermore, the recommender 110, may assign one or more recommendation value ratings 114, 115, to the content 101, 102 respectively, to characterize and quantify the degree of that the recommender 110 actually recommends the individual content 101, 102. These recommendation value ratings 114, 115 may be numbers (e.g., −10 to 10), descriptive ranks or weights (good to bad, best to worst, great to un-desirable, etc.), or any other measurement that express a range of like or dislike.

Considering that there are vast amounts of content in a network, the recommendation receiver 140 would have no practical way of accessing them all to determine their value. Conventional methods of querying data sources over a network have come up with some ways of analyzing the value of content, such as formulaic based search engines that run algorithms that objectively sort through data based on simple numeric variables. These variables have no particular value to the recommendation receiver 140, but have been determined through a process that may not even consider the recommendation receiver's 140 values, trust, or experiences. This shortcoming of conventional query or analysis methods of content on a network are overcome through the recommendation network described herein.

According to conventional networks, and their known query and ranking methods, an algorithm could be applied that would look at how many referring sources exist for content. However, according to embodiments of the invention, a new result can be determined based on an algorithm that calculates the number of bundles that include the content, as well as the ratings and scores produced by the recommendation network, to produce a far more valuable result.

The rating values may be processed by algorithms that can manipulate all of the ratings provided to it by a rating entity, and return a result. The algorithms and rating values may be utilized by rating entities within the network, or even by other users, whether inside or outside the network, that are interested in receiving a result based on the trust values within the network. Those other users may not be active participants in rating or recommending, but they may still greatly benefit from the usefulness of the recommendation network. In one embodiment of the invention, the result may be a ranking of content based on a topic, or key term, submitted or stored in a query, wherein the various values of trust afforded to the recommending entities (e.g., the primary recommenders or the intermediary recommenders) can be utilized to produce the ranking. Some algorithms may be expressed herein, but it should be appreciated that there are various ways of calculating, storing, processing, or in any other way utilizing the trust values within the recommendation network. Hence, embodiments of the invention should not be limited solely to the algorithms described herein.

The recommendation receiver entity (recommendation receiver 140) may receive the recommendations in the topic channel 112 via a communication 146, also referred to as a recommendation communication or a channel communication herein. This may be a communication in one of many forms, in a push or pull fashion, or via a variety of transmission mediums. In one embodiment of the invention, it may be a website object that has a variety of interne hypertext links to the content 101, 102. The recommendation receiver 140 may utilize a device 141 to receive the communication 146.

The recommendation receiver 140 may also assign a trust rating, or weight, to the recommender 110 that provides the topic channel 112. In one embodiment of the invention, the receiver 140 may have some personal knowledge of the recommender 110, and hence may have a basis in experience to trust that the recommender 110 may provide a noteworthy or valuable recommendation. However, in other embodiments of the invention, the receiver 140 may have not a personal knowledge of the recommender 110, but may still have some basis for assigning a trust rating, such as knowledge of the recommender's 110 credentials or reputation for making valuable recommendations. The trust rating 142 is a "relative" trust rating since it represents the degree of confidence that the recommendation receiver's 140 has that the recommendation source 110, relative to other recommendation sources, can make a recommendation that the recommendation receiver 140 considers noteworthy, important, interesting, or valuable. The relative trust rating 142 may be changed at any time as relative trust grows or diminishes in the recommender 110. This relative trust ratings may be based on subjective criteria, such as attributes, characteristics, or credentials of recommender 110. The trust ratings may be characterized by a quantifiable rating scale because rating entities may have varying levels of trust in the rated entities within the network. The values on the rating scale, therefore, could represent the varying levels of trust. This can be especially beneficial to the network because it can allow the rating entities to express a wide range of trust, which is truer to life, and which, ultimately, allows for a much more profound and reliable method for ranking content. One should keep in mind, however, that rating scales are varied, and any number of different rating scales may be applied to embodiments of the invention. Therefore, embodiments of the invention should not be limited to only rating scales described herein. A rating scale, as described herein, therefore, may include more than one degree of trust. For example, one rating scale may be a binary rating scale, indicating both a "high" trust and a "low trust" value, or even a "trust" and a "non-trust" value. Other ratings scales may include multiple values, such as a numerical rating scale, which may include numerical values ranging from one ("1") to ten ("10"), one ("1") being the lowest value and ten ("10") being the highest value. Other rating scales may take into consideration negative numbers or any number of complex variables. For example, a scale of negative ten ("−10") to a value of positive ten ("10"). The negative values could represent levels of distrust, or degrees to which the rating entities may resist, disvalue, or disapprove of a recommender and their recommendations. The relative trust rating may also be a descriptive rank or weights (high to low, great to little, etc.), or any other measurement that express a range of trust.

In one embodiment of the invention, the recommendation receiver 140 may assign different levels of trust to the recommender 110 regarding different topics (e.g., I trust the recommender's political recommendations, but not his religious recommendations). For example, the recommendation receiver may specifically assign the relative trust value 142 a degree that the recommendation receiver 140 actually trusts the recommender 110 on the specific topic of the topic channel 112.

The relative trust rating 142, as well as the previously mentioned recommendation value ratings 114, 115 can be values that can be stored in electronic memory, processed by one or more computer devices, and used by a network algorithm to filter, sort and rank content 101, 102 for the recommendation receiver 140, or for other network users.

As shown in FIG. 1, the recommendation receiver 140 may receive recommendations from a plurality of recommenders, not just recommender 110. Recommendation receiver 140 is shown as receiving additional recommendations 107, 108 of content 105, 106 from recommender 120. Recommender 120 may have recommended content 105, 106, assigned recommendation value ratings 124, 125, and also assigned the recommendations 107, 108 to one or more topic channels, 123, 122, in a similar fashion as recommender 110. Similarly, the recommendation receiver may receive the channel communications 145, 147 in a similar fashion as communication 146 was received. Furthermore, the recommendation receiver 140 may also assign relative trust ratings 143, 144 to recommender 120 pertaining to each of the individual topic channels 123, 122.

Figure 2:
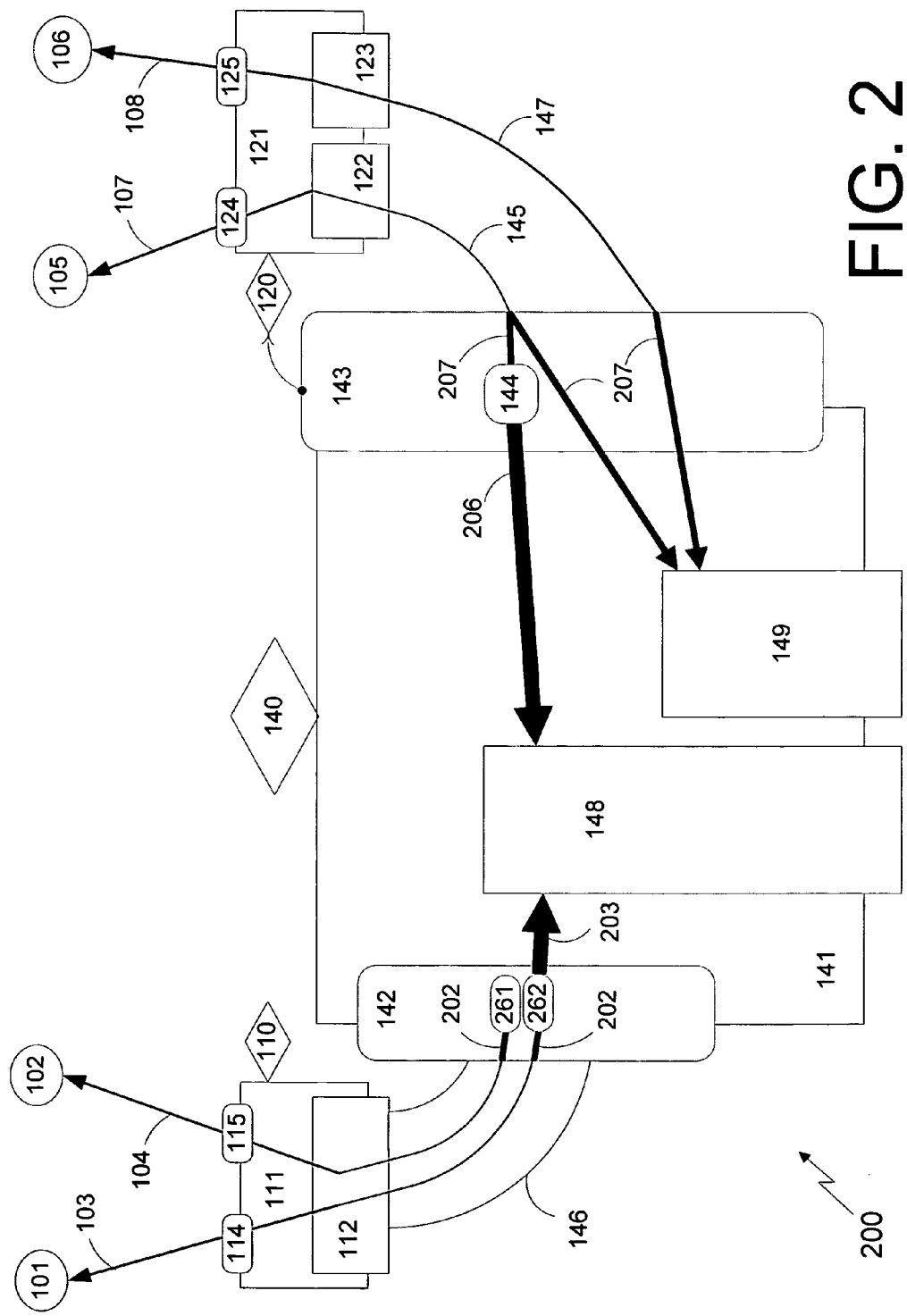
FIG. 2 is a diagram of a recommendation network 200, configured according to an embodiment of the present invention.

The recommendation receiver 140 may organize the topic channels 112, 123, 122, into labeled "bundles". FIG. 2, described further below, demonstrates one embodiment of the invention to create a bundle. Still referring to FIG. 1, however, the recommendation receiver can create the recommendation bundles 148, 149, using device 141. The recommendation bundles 148, 149 are recommendation sources as well. Specifically, the bundles are also channels, or more specifically are conglomeration of recommendation sources, such as the topic channels 112, 123, 122. However, the recommendation bundles 148, 149 may contain more information and functionality than the topic channel 112, 122, 123. The recommendation bundles 148, 149 may actually contain a plurality of channels bundled together. Information regarding the channels can be added and stored in the bundle, such as the relative trust ratings 142, 143, 144. The bundles may also contain a ranked list, or data to create a ranked list, of the content 101, 102, 105, 106 that are recommended via topic channels 112, 123, 122.

Since the recommendation receiver 140 may produce recommendation sources in the form of bundles 148, 149, the recommendation receiver 140 may also be termed a recommender. In the specific embodiment shown in FIG. 1, the receiver 140 may be considered a bundle recommender, a bundle provider, or more succinctly, a "bundler", who can provide bundles to subsequent receivers, such as recommendation receiver 160.

Recommendation receiver 160 may utilize a device 161, similar to devices 111, 121, 141, to receive any one of the bundles 148, 149 that are provided by receiver 140, to receive the topic channel 112 from recommender 110, or to create additional topic channels 167 and bundles 168, 169. The bundles 148, 149 may be transmitted via channel communications 164, 166, in a push or pull fashion. The receiver 160 may rate the recommendation receiver 140 regarding the bundles 148, 149, with trust ratings 163, 164 respectively, representing relative trust values that the receiver 160 has in the recommendation receiver (now a recommender or bundler) 140 to provide valuable recommendations, or in this case to provide valuable bundles that may contain valuable recommendations.

The recommendation receiver 160, just like the recommenders 110, 120, may also make recommendations, such as recommendation 119 of content 118. The recommendation receiver 160 may also assign recommendation value ratings 162 and create channels, such as a topic channel 167, and assign recommendations, like 119, to the topic channel 167. Similar to receiver 140, the recommendation receiver 160 may also create bundles 168, 169, and assign channels (topic channels and other bundles) to those bundles 168, 169.

Referring still to FIG. 1, devices 111, 121, 141, 161, in one embodiment of the invention, may be an electronic device, such as a transceiver, a desktop computer, a laptop computer, a Personal Digital Assistant (PDA), a BlackBerry™ Device, a cell phone, a telephone, etc. In another embodiment of the invention, the devices 111, 121, 141, 161, may be a storage medium, either electronic, or capable of being read by an electronic device, such as a computer memory, a hard disk, a compact disk, a magnetic disk, a flash drive, a video or audio tape or file, a cassette tape, etc. On the other hand, other embodiments of the invention are not limited to electronic devices or storage mediums, and the devices 111, 121, 141, 161, may be a representation of a non-electronic medium. Each of the devices 111, 121, 141, 161, do not all have to be the same device, but rather can be any combination of those listed above, or any other communication device that would be known to one skilled in the art, to effectuate the embodiments of the invention described herein.

Furthermore, still referring to FIG. 1, recommendations 103, 104, 107, 108, 119 can take many different forms, such as a web link, an RSS feed, a web posting, an email, a data stream, or any other electronic format that is storable or transmittable through a network. They can be processed, or transmitted in real-time, or near real time.

It should be noted that although the recommendations 103, 104, 107, 108, 119 are shown as having recommendation value ratings 114, 115, 124, 125, 162, not all content has to be rated by a recommender to be included in the recommendation network 100.

The bundles 148, 149, 168, 169, may be considered packages, or containers for, potential or existing channels, and their accompanying recommendations. However, the bundles 148, 149, 168, 169 are not limited by time or number. Once set up, recommendations 103, 104, 107, 108, 110 may simply flow through the bundle in an unaltered fashion, but because they have been organized into a bundle, they become intermediary recommendations, even though the original content 101, 102, 105, 106, 118 has not necessarily changed. In essence, if the bundle is set up by the intermediary recommender, for example recommendation receiver 140, then anything that is sent from, or through, the bundle becomes valuable to some degree that the recommendation receiver 160 assigns trust to recommendation receiver 140.

FIG. 2 illustrates a recommendation network 200 according to an embodiment of the invention. Various elements from FIG. 1 appear which are described above. In FIG. 2, some of the elements from FIG. 1 are shown in an expanded, or blown-up, view to illustrate the embodiment. In FIG. 2, recommendations 103, 104 are shown to both be combined into topic channel 112 to exemplify that recommender 110 recommends them both and also categorizes them into the same topic. Communication 146 illustrates how recommendations 103, 104 are passed along to the receiver 140 and received by device 141. Recommendation receiver 140 may have assigned a specific trust rating 142 so that when recommendations 103, 104 are received by the device 141, then a specific data value may be assigned to recommendations 103, 104. These data values enhance the recommendations because they add additional information to the recommendations 103, 104 which device 141 can use to manipulate and process the recommendations 103, 104, such as via a ranking algorithm, to produce a score 202, by which they can be ranked in a list. Recommendation receiver 140 may further create and utilize filters 261, 262, which can further enhance, or reduce, the score that had been produced. The filters 261, 262 may be additional relative trust ratings, and hence may have similar characteristics to trust ratings already described herein.

As shown in FIG. 2, trust filter 261 may be assigned a value that will actually prevent the recommendation 104 from passing through to be included in any channels and bundles that recommender receiver 140 may create. This is particularly useful for recommendation receivers who trust and value most recommendations from a topic channel, but would like to remove certain offending or non-valuable recommendations from being in any new channels or bundles that they create. Trust filter 262, on the other hand may allow the desirable or valuable recommendations, such as recommendation 103, to be included in new channels or bundles that recommendation receiver 140 creates. The trust filter 262 may, though doesn't have to, enhance the trust value further, as shown by the enhanced score 203. Consequently, recommendation receiver 140 may bundle recommendations from topic channel 112, minus all filtered recommendations, and so recommendation 103, and its accompanying content 101 finds its way through to bundle 148.

Also in FIG. 2, recommendations 107, 108 are shown to be included in separate topic channels 122, 123 respectively. Recommendation receiver 140 may create a general recommender trust rating 143 which may indicate that all recommendations from recommender 120 are to have a certain relative trust rating so that they can be combined into a bundle 149. This bundle 149 may be a termed a "general recommender bundle" since it will include all recommendations from recommender 120 without filtering. Those recommendations 107, 108 may create a certain score 207. At the same time, recommendation receiver 140 may also assign a trust rating specifically to topic channel 122, for example, as an indication of that recommendation receiver 140 trusts recommender 120 even more for the topic of topic channel 122. As a result, the score may be enhanced and become score 206. Recommendation receiver 140 may bundle topic channel into bundle 148.

Bundle 148 may be characterized by any distinguishing characteristic that allows the bundle to be easily distinguished by a user or entity in the network, and therefore, easily recognizable as an item of interest. In one embodiment of the invention, the distinguishing characteristic may be a topic or category that is related to both the topics of topic channel 112 as well as the topic of topic channel 122. Consequently, recommendation receiver 140 has become a recommendation source and provided a bundle relating to a topic that is the same or similar to the previous originating topics of topic channel 112 and 122. However, because the category or topic of bundle 148 can be different (e.g. by refinement, expansion, interpretation of the topic), then recommendation receiver 140 produces an organizing and rating enhancement to the recommendations, and makes it more valuable in the network 200. Thus receiver 140, and other subsequent users who subscribe to bundle 148, can benefit from the recommendation receiver's 140 treatment to the recommendations because there is now more data that can be used to better organize, filter, sort or rank recommendations. The same benefit holds true for bundle 149.

Figure 3:
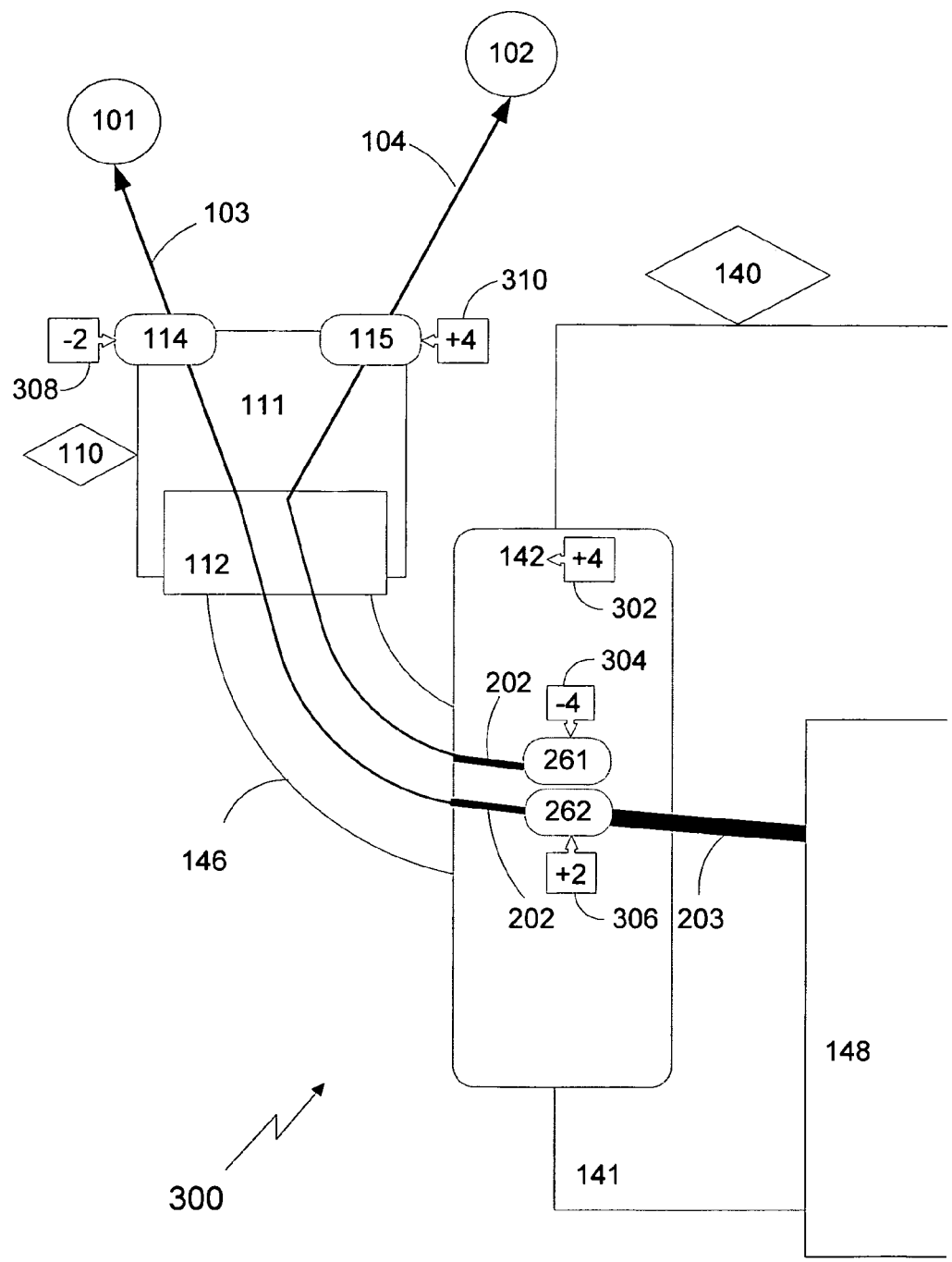
FIG. 3 is a diagram of a recommendation network 300, configured according to an embodiment of the present invention.

FIG. 3 illustrates a recommendation network 300 according to an embodiment of the invention. Various elements from previous figures may appear which have been described further above. In FIG. 3, some of the elements from previous figures may be shown in an expanded, or blown-up, view to help illustrate the embodiment. In FIG. 3, specific numerical values 308, 310, 302, 304, 306 are shown as illustrative of recommendation value ratings 114, 115, trust rating 142, and trust filters 261, 262. These specific numerical values will be discussed in more detail in conjunction with FIG. 5 below.

Figure 4:
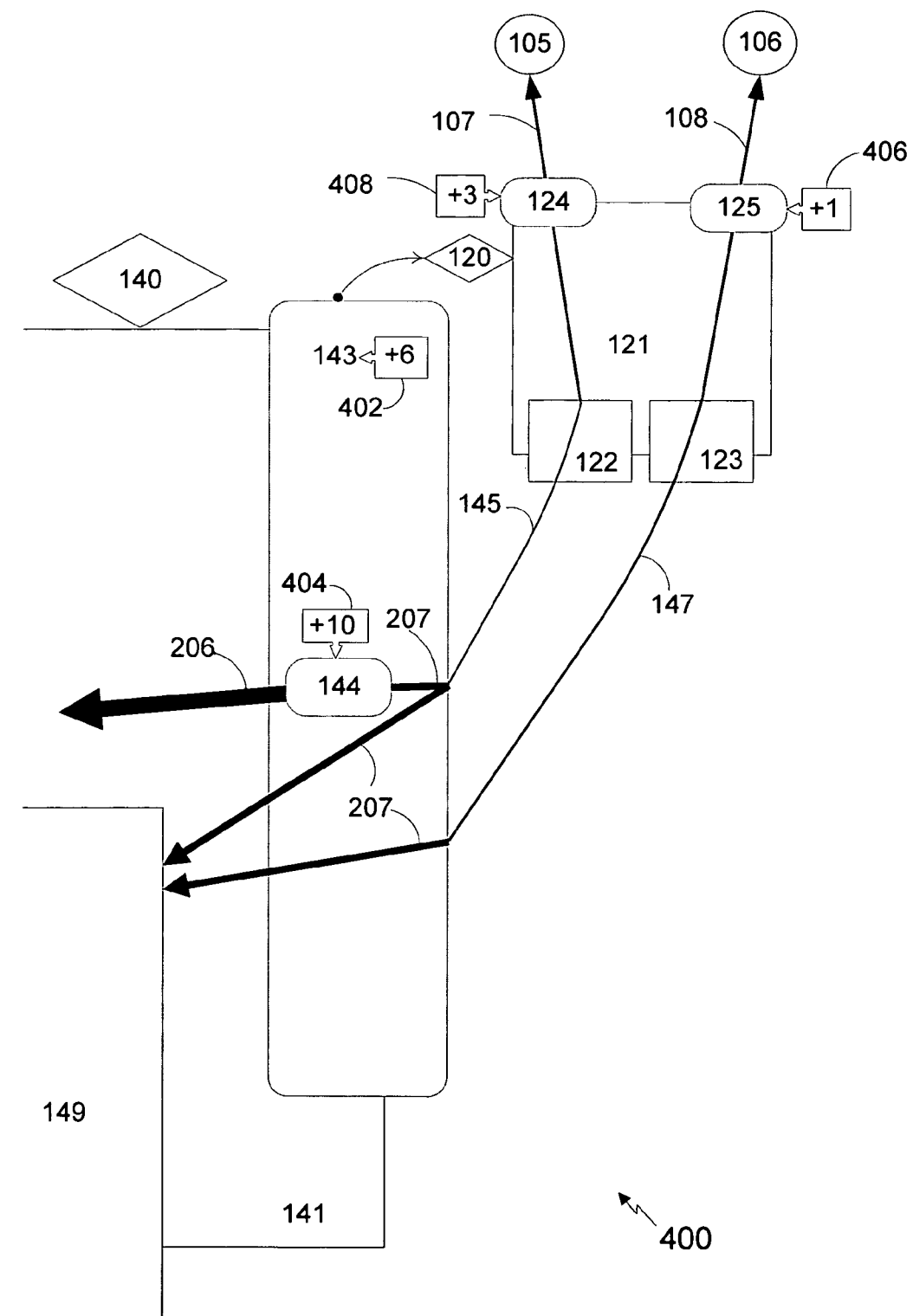
FIG. 4 is a diagram of a recommendation network 400, configured according to an embodiment of the present invention.

FIG. 4 illustrates a recommendation network 400 according to an embodiment of the invention. Various elements from previous figures may appear which have been described further above. In FIG. 4, some of the elements from previous figures may be shown in an expanded, or blown-up, view to help illustrate the embodiment. In FIG. 4, specific numerical values 402, 404, 406, 408 are shown as illustrative of recommendation value ratings 124, 125, and trust ratings 143, 144. These specific numerical values will be discussed in more detail in conjunction with FIG. 5 below.

FIG. 5 illustrates a recommendation network 500 according to an embodiment of the invention. Various elements from previous figures may appear which have been described further above. In FIG. 5, some of the elements from previous figures may be shown in an expanded, or blown-up, view to help illustrate the embodiment. In FIG. 5, an object 502 is shown to contain the contents of bundles 148 and 149. The object contains information about the bundle including the bundles name 504, the recommended content 506 minus filtering, the recommendation value ratings 508 from the recommender who provided the recommendations, as well as any trust ratings 510 from the recommender receiver 140. These recommendation value ratings 508 and trust ratings 510 can be utilized, such as by processing with an algorithm, to create the scores 202, 203, 206 and 207 shown previously in conjunction with FIG. 2, FIG. 3, and FIG. 4 above.

In one embodiment of the invention, the device 141, or any other device mentioned herein, may utilize a variety of algorithms, such as a summation algorithm, an averaging algorithm, or a combination of the two. Other algorithms may include utilizing characteristics of recommenders to ascertain which trust ratings are weighted higher in the algorithm. The recommendation receiver 140 may utilize any number of, or combination of, algorithms and variables to craft the results that are most agreeable to the recommendation receiver 140, based on the receivers 140 own opinion of how to process ratings for specific types of content, such as for highly technical content, or content of a deeply individualized opinion, such as religion or politics. For those types of content, then the receiver 140 may wish to utilize an algorithm that highly favors trust ratings. Hence, in addition to being able to provide ratings, which allows the rating entities to manipulate the variables process within an algorithm, the recommendation network may also allow the receiver the flexibility to manipulate the method of processing those variables within the algorithm. Thus the receiver 140, or any other recommendation receiver described herein, may have a great deal of flexibility in determining what content is the most relevant or trustworthy.

Figure 6:
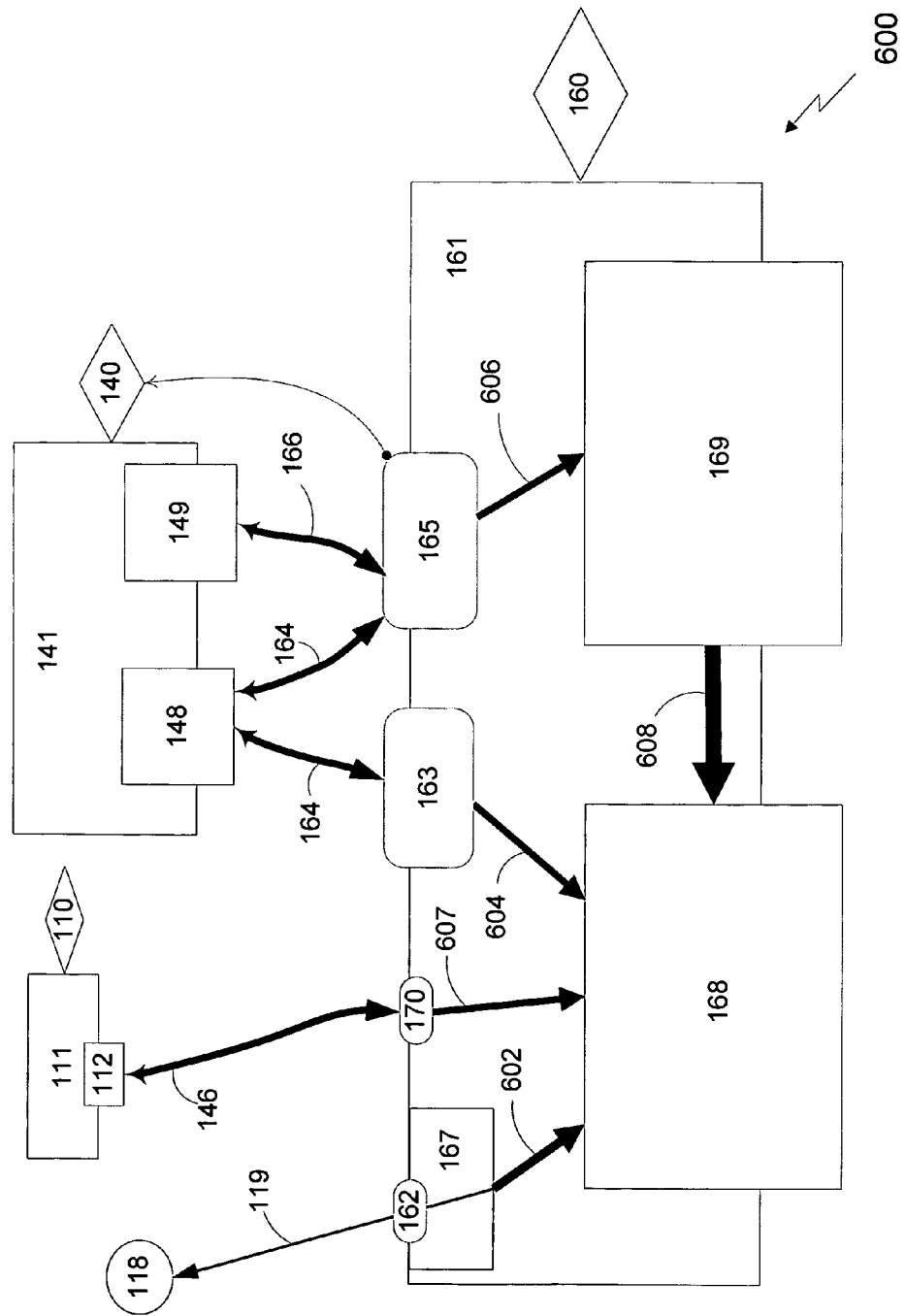
FIG. 6 is a diagram of a recommendation network 600, configured according to an embodiment of the present invention.

FIG. 6 illustrates a recommendation network 600 according to an embodiment of the invention. Various elements from previous figures may appear which have been described further above. In FIG. 6, some of the elements from previous figures may be shown in an expanded, or blown-up, view to help illustrate the embodiment. In FIG. 6, recommendation receiver 160, with device 161, may do anything that recommenders 110, 120, can do with their respective devices, 111, 121 and may also do anything that recommendation receiver/bundler 140 may do with its respective device 141. Thus, recommendation receiver 160 may make a recommendation 119 of content 118, may assign a recommendation value rating 162 to the recommendation 119, and may create topic channel 167 then assign the recommendation 119 to the topic channel 167. The recommendation receiver 160 may also receive bundles 148, 149, via recommendation communications 164, 166, assign trust ratings 163, 165 to recommendation source 140 regarding bundles 148, 149, may create new bundles 168, 169, and may assign the topic channels and bundles 148, 149 to the new bundles 168, 169. There is no limit to the number of recommendation bundles that recommendation receiver 160 may create and recommend. Recommendation receiver 160 may also receive topics channels, such as topic channel 112 from recommender 110, assign trust values, such as trust value 170 to recommender 110 regarding topic channel 112, and assign the topic channel 112 to a bundle, such as to the new bundle 148. Device 161 may also create scores 602, 604, 606, 607, 608 which can be utilized to rank content that is contained in the received bundles 148, 149 and the topic channels 167, 112.

Bundle 169 may be another exemplary "recommender" bundle wherein all recommended bundles from recommendation receiver/bundler 140 are included in the bundle 169. Bundle 168, however, may be characterized by a topic or category that is somehow related in the mind or perspective of recommendation receiver 169, to the topics of topic channel 112 as well as the topic of topic channel 167, as well as the topics or some other distinguishing characteristic of recommendation bundles 148 and 169. Consequently, recommendation receiver 160 has become a recommendation source, a recommender and a bundler, and can provide additional bundle relating to a topic that is similar, or related (although it doesn't have to be similar) to the previous originating topics of topic channel 112, 167, bundle 148 and bundle 169. However, because the category or topic of bundle 148 can be different from the previous topics, even slightly different, (e.g., broader, more refined, or horizontally related, etc.), then recommendation receiver 160 produces an organizing and rating enhancement to the recommendations, and makes then more valuable in the network 200. Thus receiver 140, and other subsequent users who subscribe to bundle 168, can benefit from the recommendation receiver's 160 treatment to the recommendations because there is now more data that can be used to better organize, filter, sort or rank recommendations. The same benefit holds true for bundle 169.

The recommendation receiver 160, (now also recommender 160 or bundler 160), may also filter recommendations out of the bundle. Furthermore, the bundles 168, 160 may automatically recognize, define, or classify, any of the recommendations contained included in that bundle 250 with the new category or topic assigned by recommendation receiver 160 to the bundle 148. In other embodiments of the invention, the bundles 168, 169 may be related to characteristics of the previous recommenders. In yet other embodiments of the invention, the bundle may be related to characteristics of the recommendation receiver 160. Hence, the bundles need not necessarily be assigned to a topic, but may have any distinguishing characteristic that allows the bundle to be easily distinguished by a user or entity in the network, and therefore, easily recognizable as an item of interest.

Figure 7:
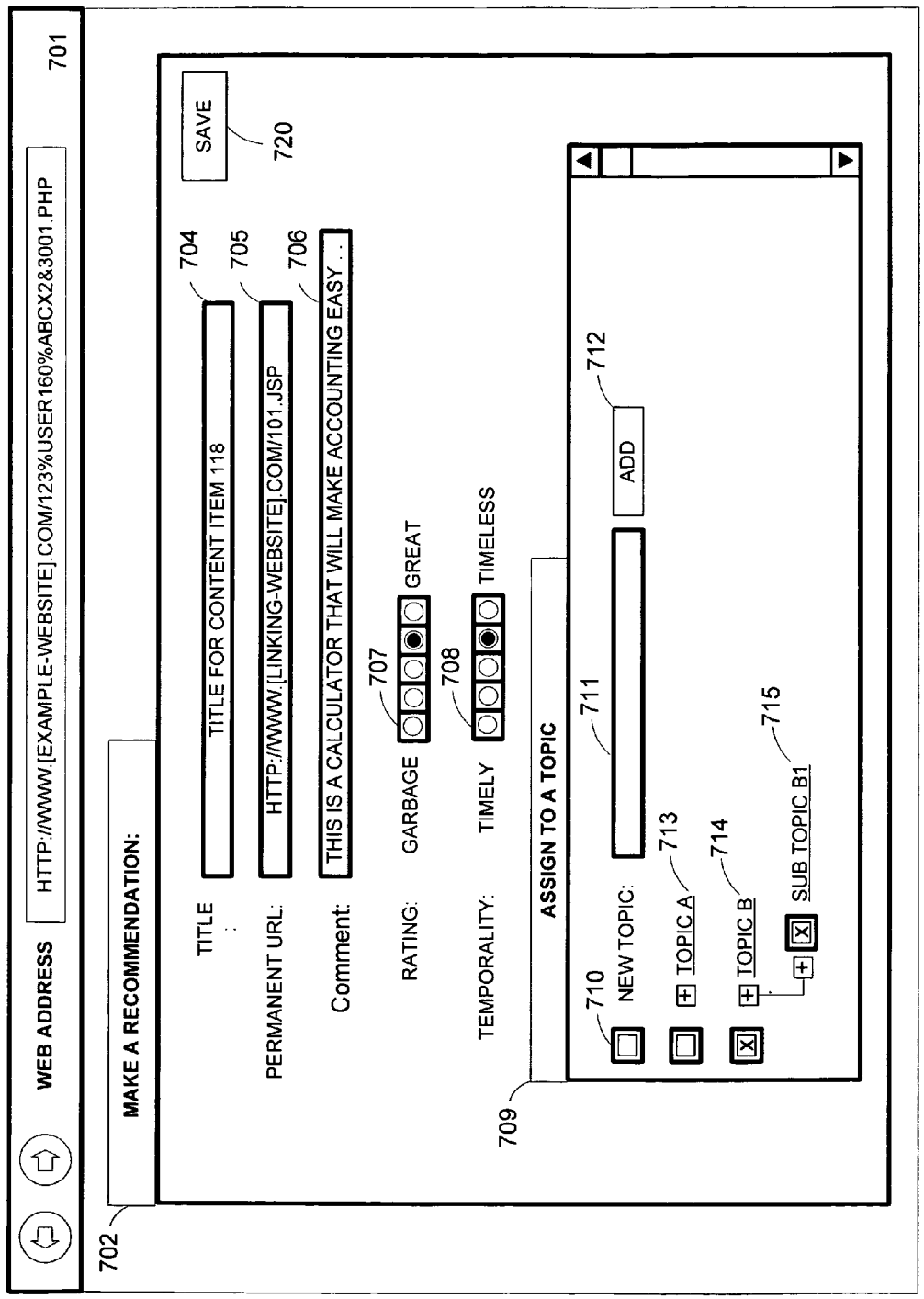
FIG. 7 is a representation of a recommendation network 700, configured according to an embodiment of the present invention.

FIG. 7 illustrates a recommendation network 700 according to an embodiment of the invention. In FIG. 7, a web site 701 may include a graphical user interface (GUI) with a recommendation console 702 to allow a user to make a recommendation. The recommendation console 702 may include a title field 704 for entering a short descriptive title by which an item of recommended content may be recommended or referred. The recommendation console 702 may also include web address field 705 to enter the permanent URL for recommended content. Further included may be a comment field 706 to further describe the content beyond what is included in the short descriptive title field 704. Also included may be a recommendation value rating field 707 for entering a recommendation value. The recommendation value rating field 707 may be part of a scale of values. Also included may be a temporality rating field 708 to indicate to what degree the content is relevant over time. A popular content item of the day, related to current events, though not particularly relevant or interesting as time goes on, may get a rating close to the "timely" end of the scale. On the other hand, a content item that has relevance over a long period of time, such as an article on a scientific principle, may have a rating close to the "timeless" end of the scale.

A topic listing 709 may also be included which lists various topics or topic channels 713, 714, and subtopics or subtopic channels 715. A new topic field 711 may also be included from which the user can create a new topic or topic channel. Buttons 710 and 712 may be used to create the new topic that is entered into the new topic field 711.

Figure 8:
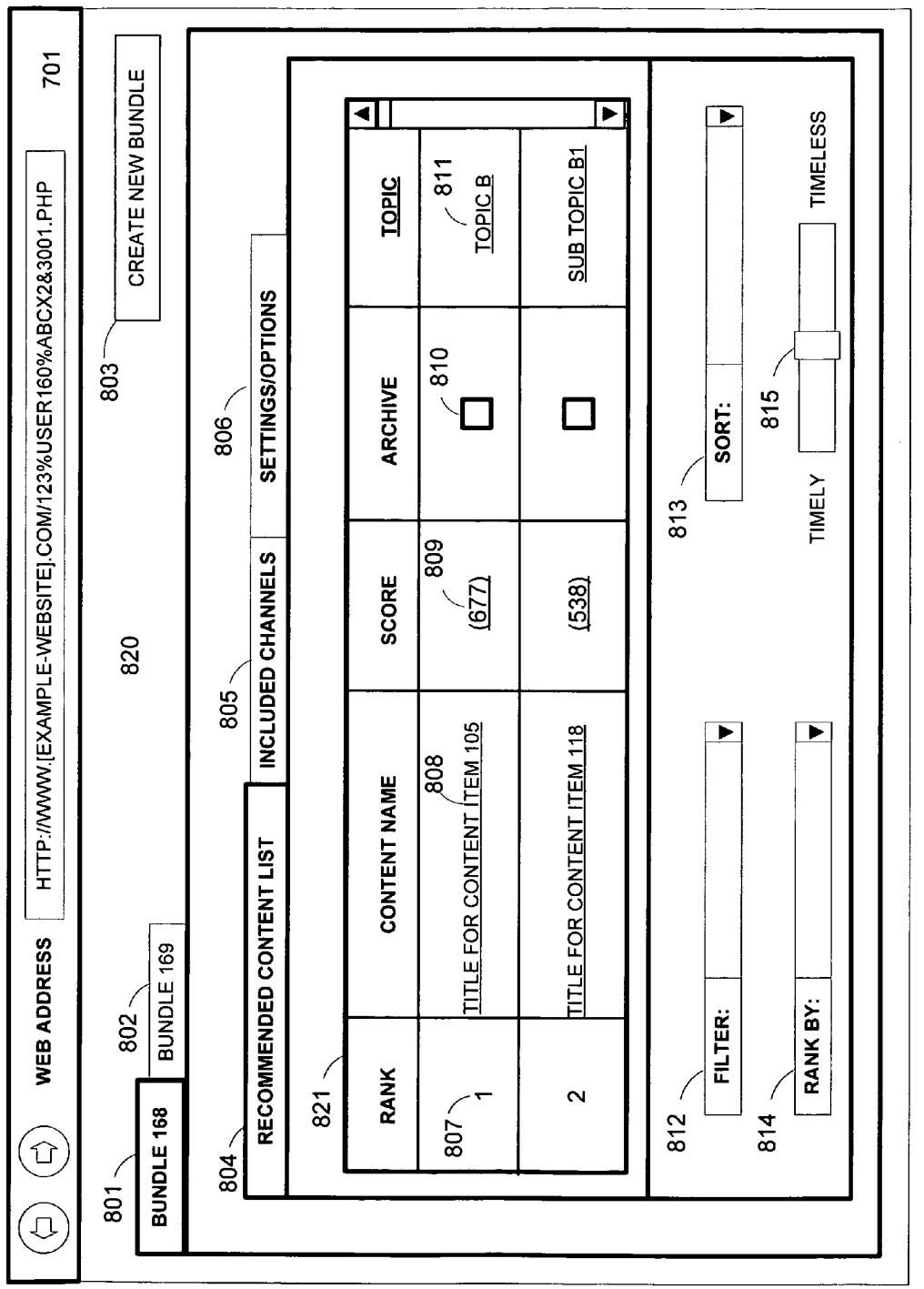
FIG. 8 is a representation of a recommendation network 800, configured according to an embodiment of the present invention.

FIG. 8 illustrates a recommendation network 800 according to an embodiment of the invention. Various elements from previous figures may appear which have been described further above. In FIG. 8, the website 701 may include a bundle manager console 820, that may include individual bundle consoles 801, 802, as well as a new bundle button 803, to create a new bundle. Bundle console 801 may include various sub-consoles like a ranked content list tab 804, a channel list tab 805, and a settings tab 806.

The content list tab 804 may include a ranked list of recommended content contained within channels that are included in the bundle and shown on the channel list tab 805 described in conjunction with FIG. 9 below. Still referring to FIG. 8, a ranked content list 821 may be included on the content list tab 804. The ranked content list 821 may include descriptive data and links, like a rank 807 to describe the position on the ranked content list 821 of an individual recommended content item accessible via content link 808 to permit the user to access the content. A rank score link 809 may display the score that the content item received. The rank score link 809 may be a link to permit the user to access a description of how the score was produced, including relevant recommendation value ratings, trust value ratings, recommendation sources, such as recommenders, bundlers, bundles, topic channels, etc., that have been involved in recommending that content item. Furthermore, an archive button 810 may be included that may remove the content item from the ranked list 821 after it has been visited by the user. Other information 811 may also be included on the ranked list 821, such as an associated topic. A filter function 812, such as dropdown selector or a filter entry field may be included to filter the ranked content list 821 according to specific criteria. Likewise a sort function 813, such as a dropdown selector or a sort entry field, may be included to sort the ranked content list 821. A rank-by function 814, such as a dropdown selector or an entry field may be included to define ranking criteria or algorithms. A temporality filter function 815, such as a slider, may be included to allow the ranked content list 821 to show content that is relevant in a timely or timeless fashion according to a temporality rating that may have been assigned to the content by recommenders.

Figure 9:
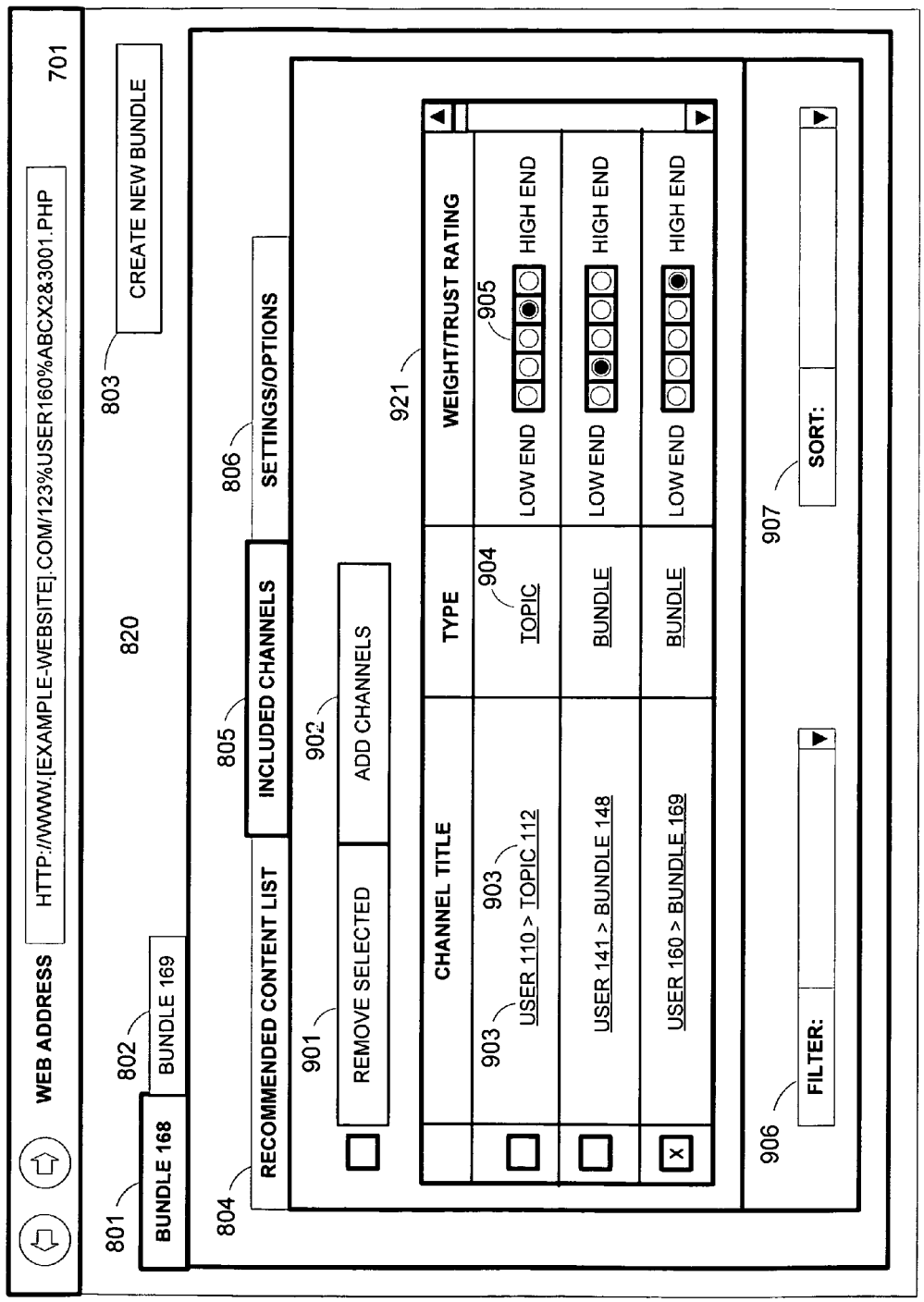
FIG. 9 is a representation of a recommendation network 900, configured according to an embodiment of the present invention.

FIG. 9 illustrates a recommendation network 900 according to an embodiment of the invention. Various elements from previous figures may appear which have been described further above. In FIG. 9, the channel list tab 805 is described in more detail. The channel list tab 805 may include a channel list 921 that belong to, or are included in the bundle. The channel list may include a channel title link 903 that can describe the recommendation source, such as the recommender or bundler that provided the channel, as well as a channel title, such as the topic channel title or the bundle name. The channel title link 903 may permit the user to access more information regarding the recommendation source or the channel. More than one link may be included as part of the channel title link, such as separate links to a channel description page or a link to a recommender page. A channel type link 904 may also be included to describe the type of channel, such as being either a topic channel or a bundle. A trust rating field 905 may also be included on a scale or trust ratings for the user to assign a trust rating to the recommendation source of the channel (e.g., recommender 110 on topic channel 112 gets a high trust rating closer to the high end of the scale as the user may have a high degree of trust in recommender 110 regarding the topic of channel 112).

A filter function 906, such as dropdown selector or a filter entry field may be included to filter the channel list 921 according to specific criteria. Additional channel filters may be set for the channel, for example by clicking on the channel title link 903 that may allow the user to set specific trust filters. Likewise a sort function 907, such as a dropdown selector or a sort entry field, may be included to sort the channel list 921.

A channel adder function, such as channel addition button 902, may also be included. The channel addition button 902 may launch a directory of channels or a search page where the user can browse or search for desired channels. A channel removal function, such as channel remover button 901 may also be included to remove channels from the bundle.

Figure 10:
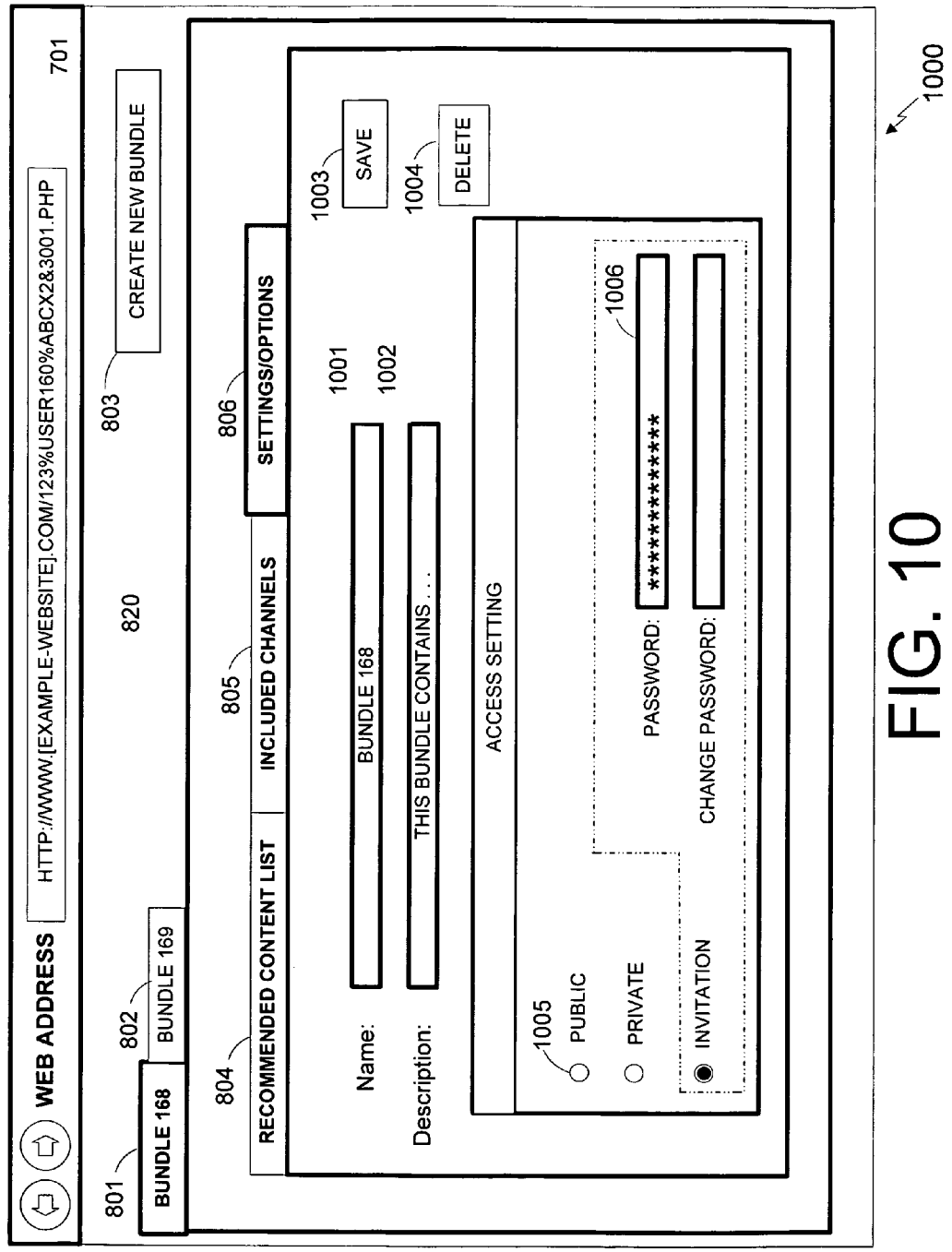
FIG. 10 is a representation of a recommendation network 1000, configured according to an embodiment of the present invention.

FIG. 10 illustrates a recommendation network 1000 according to an embodiment of the invention. Various elements from previous figures may appear which have been described further above. In FIG. 10, the bundle settings tab 806 is described in more detail. The bundle settings tab 806 may include descriptive elements of the bundle itself, such as bundle name field 1001 to give the bundle a short descriptive name and a bundle description field 1002 to add additional information beyond that possible in the bundle name field 1001. A bundle save function, such as bundle save button 1003 may also be included to save the bundle or changes to the bundle settings. A bundle delete function, such as bundle delete button 1004 may also be included to delete the bundle. An access setting function, such as access setting button 1005 may be included to set the access that other recommendation receivers may have to the bundle. For example, the bundle may be set to have an access setting of "public", whereby any entity can access and use the bundle in subsequent bundles on the network. If the bundle is set to an access setting of private, then perhaps only the bundler, or bundle creator, may have access to use the bundle on the network. On the other hand, the bundle may be set to an access setting of "invitation", whereby only invited entities may know of, or use, the bundle, if they are provided with the proper password to authenticate their access rights. A bundle password field 1006 may be provided to store that password, or change it, as necessary.

Figure 11:
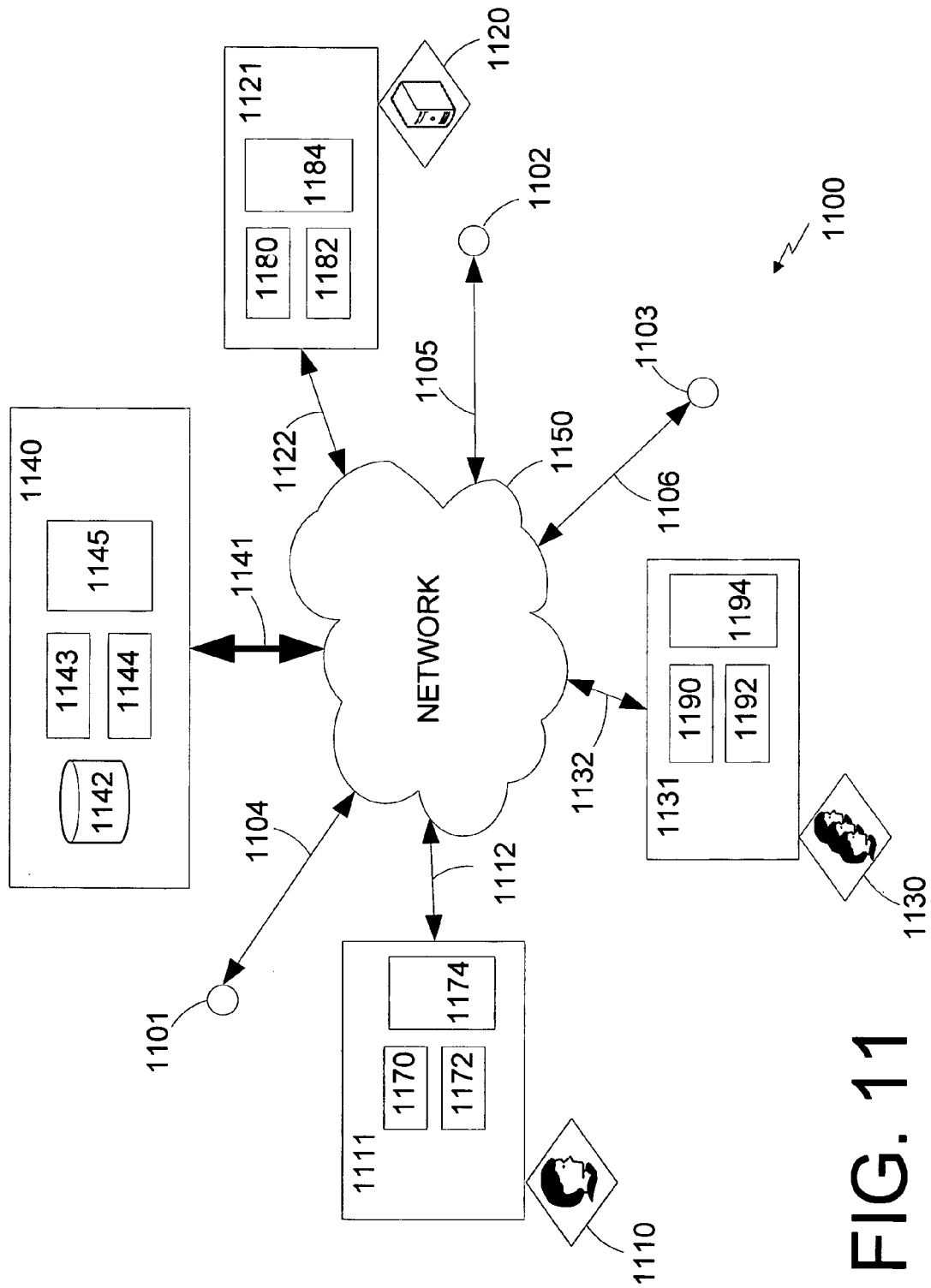
FIG. 11 is a representation of a recommendation network 1100, configured according to an embodiment of the present invention.

FIG. 11 illustrates a recommendation network 1100 according to an embodiment of the invention. FIG. 11 is a representation of a recommendation network 1100, comprising any of the embodiments of the invention described in conjunction with FIG. 1 through FIG. 10, but described in a more simplistic network diagram, to simplify the complexity shown of the various interrelations between entities. The recommendation network 1100 may include a plurality of recommendation network entities, 1110, 1120, 1130. Each one can represent any, or all, of the roles described herein, such as recommender, recommendation receiver or bundler, as described more fully in embodiments of the invention herein. Each entity 1110, 1120, 1130 may utilize a communication device 1111, 1121, 1131 to make communications 1112, 1122, 1132 across a computerized network 1150. The communication devices may be similar to any of the devices described herein, such as the computer device described in conjunction with FIG. 12 below. The communications 1112, 1122, 1132 may represent any one of recommendations or channel communications, such as topic channel or bundle communications described in embodiments of the invention herein. Content recommendations 1104, 1105, 1106 may represent recommendations about content 1101, 1102, 1103, from any of the recommendation network entities 1110, 1120, 1130, or from other entities not shown.

In addition, the recommendation network 1100 may also include a server device 1140 to receive server communications 1141, which may comprise communications 1112, 1122, 1132 and recommendations 1104, 1105, 1106. The server device 1140 may also receive and store ratings and preferences of the various entities. As a result, the server device 1140 can process, analyze, compute or in any other way manipulate the communications 1112, 1132, 1122, recommendations 1104, 1105, 1106, ratings, rating criteria, or any other information provided to it from the recommendation network entities 1110, 1120, 1130 through their respective communication devices 1111, 1121, 1131. The server device 1140 can also return, relay, or transmit, any communications 1112, 1122, 1132 or recommendations 1104, 1105, 1106 across the network. The server device 1140 may be a computer system as shown in exemplary FIG. 12. In addition, the server device 1140 may include a database 1142 configured specifically for use with a recommendation network application, to store specific data and meta data regarding preferences of entities 1110, 1120, and 1130, including recommendations, bundles, ratings, rating criteria, etc.

The server device 1140 may also be utilized, either itself, or in conjunction with other servers or devices not shown, to host a website for use by any of the recommendation network entities 1110, 1120, 1130, or other entities, over the network 1150, to make queries, make or view recommendations, create bundles, subscribe to bundles, make or edit ratings and rating criteria or perform any other process or method described herein. Recommendation network entities 1110, 1120, 1130 can access the website via a user interface accessible through the communication devices 1111, 1121, 1131, any of which may be computer systems, such as the exemplary computer system described in exemplary FIG. 12.

In addition, the server device 1140 may rate, rank, sort, filter, process queries, produce results, etc., based on any number of algorithms that include as its variables or include data related to items, recommendation sources, channels, content, topic channels, ratings and rating criteria, recommenders, recommendation receivers, bundlers, bundles or any other information provided by the recommendation network entities 1110, 1120, 1130, or others, over the network 1150.

Furthermore, as shown in FIG. 11, the server may utilize machine readable medium that may utilize computerized instructions, such as software modules. For example, the server may utilize a recommendation rating module 1143, a trust rating module 1144, or a bundle module 1145. The recommendation rating module 1143 may be utilized to track and process recommendation value ratings made by the entities 1110, 1120, 1130. The trust rating module 1144 may be utilized to track and process trust ratings made by the entities 1110, 1120, 1130. The bundle module 1145 may be utilized to maintain bundles that may be created by the entities 1110, 1120, 1130. All of these modules may tie into the database 1142 to read and write information, and coordinate with profile or preferences settings, or other data and meta-data, that pertain to the particular user entities 1110, 1120, 1130.

Client software modules may be utilized by the communication devices 1111, 1121, 1131 as well. For example, the communication devices 1111, 1121, 1131 may utilize recommendation rating modules 1170, 1180, 1190 to assist in the creation and modification of recommendation value ratings. Furthermore, the communication devices 1111, 1121, 1131 may utilize trust rating modules 1172, 1182, 1192 to assist in the creation and modification of trust ratings. Finally, the communication devices 1111, 1121, 1131 may utilize bundle modules 1174, 1184, 1194, to assist in the creation and modification of bundles.

Consequently, because the network entities may be making and modifying recommendation value ratings, trust ratings, or bundles, the communication devices 1111, 1121, 1131 or the server device 1140 may be referred to as "content rating devices", "recommendation value rating devices", "trust rating devices", "channel creation devices", "bundling devices", etc., depending on the particular function they may participate in, or role that they may serve, at any given time. Likewise, therefore, the network user entities 1110, 1120, 1130, may be referred to as "content rating" entities, "recommendation value rating" entities, "trust rating" entities, or "bundling" entities, depending on the particular function that they may participate in, or role that they serve, at any given time.

Figure 12:
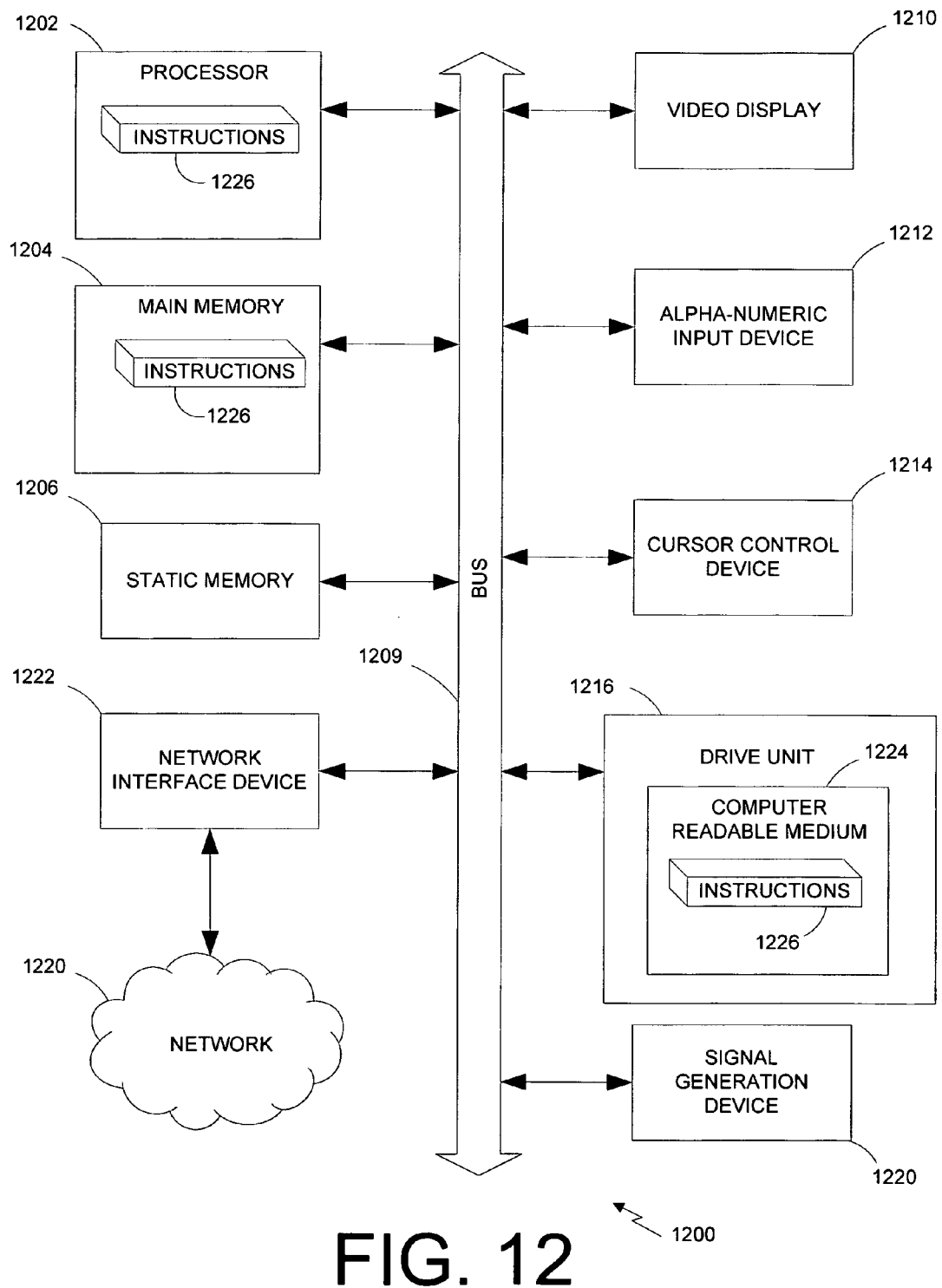
FIG. 12 shows a diagrammatic representation of a communication device in the exemplary form of a computer system 1200.

FIG. 12 shows a diagrammatic representation of a communication device in the exemplary form of a computer system 1200 within which a set of instructions, for causing the machine to perform any one of the embodiments of methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1200 includes a processor 1202, a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also may include an alphanumeric input device 1212 (e.g., a keyboard), a cursor control device 1214 (e.g., a mouse), a disk drive unit 1216, a signal generation device 1220 (e.g., a speaker) and a network interface device 1222.

The disk drive unit 1216 includes a computer-readable medium 1224 on which is stored a set of instructions (e.g., software, algorithms, etc., 1226 embodying any one, or all, of the embodiments of methodologies described above. The instructions 1226 are also shown to reside, at least partially, within the main memory 1204, within the processor 1202, or within the computer-readable medium 1224. The instructions 1226 may further be transmitted or received via the network interface device 1222. For the purposes of this specification, the term "computer-readable medium" shall be taken to include any medium that is capable of storing or encoding a sequence of instructions for execution by the computer and that cause the computer to perform any one of the embodiments of methodologies of the present invention. The term "computer-readable medium" shall accordingly be taken to include, but not be limited to, solid-state memories, optical and magnetic disks, and carrier wave signals.

Method

Figure 13:
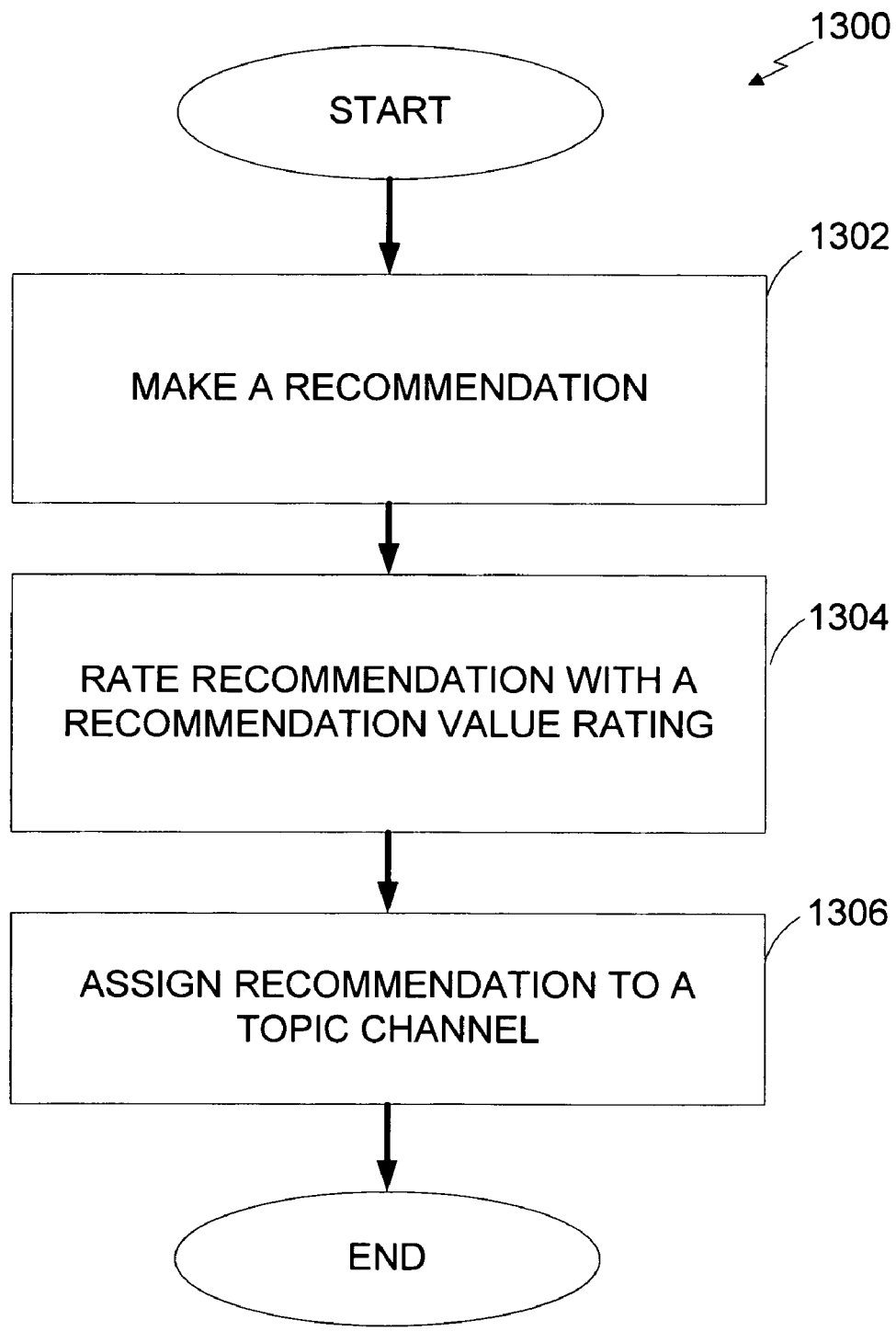
FIG. 13 is a flow diagram of one embodiment of a method 1300 for making and transmitting recommendations over a recommendation network.

FIG. 13 is a flow diagram of one embodiment of a method 1300 for making and transmitting recommendations over a recommendation network. Method 1300 begins, at processing block 1302, with making a recommendation. The method 1300 continues, at processing block 1304, with rating the recommendation with a recommendation value rating. Then, the method 1300 continues, at processing block 1306, with assigning the recommendation to a channel, such as a topic channel.

Figure 14:
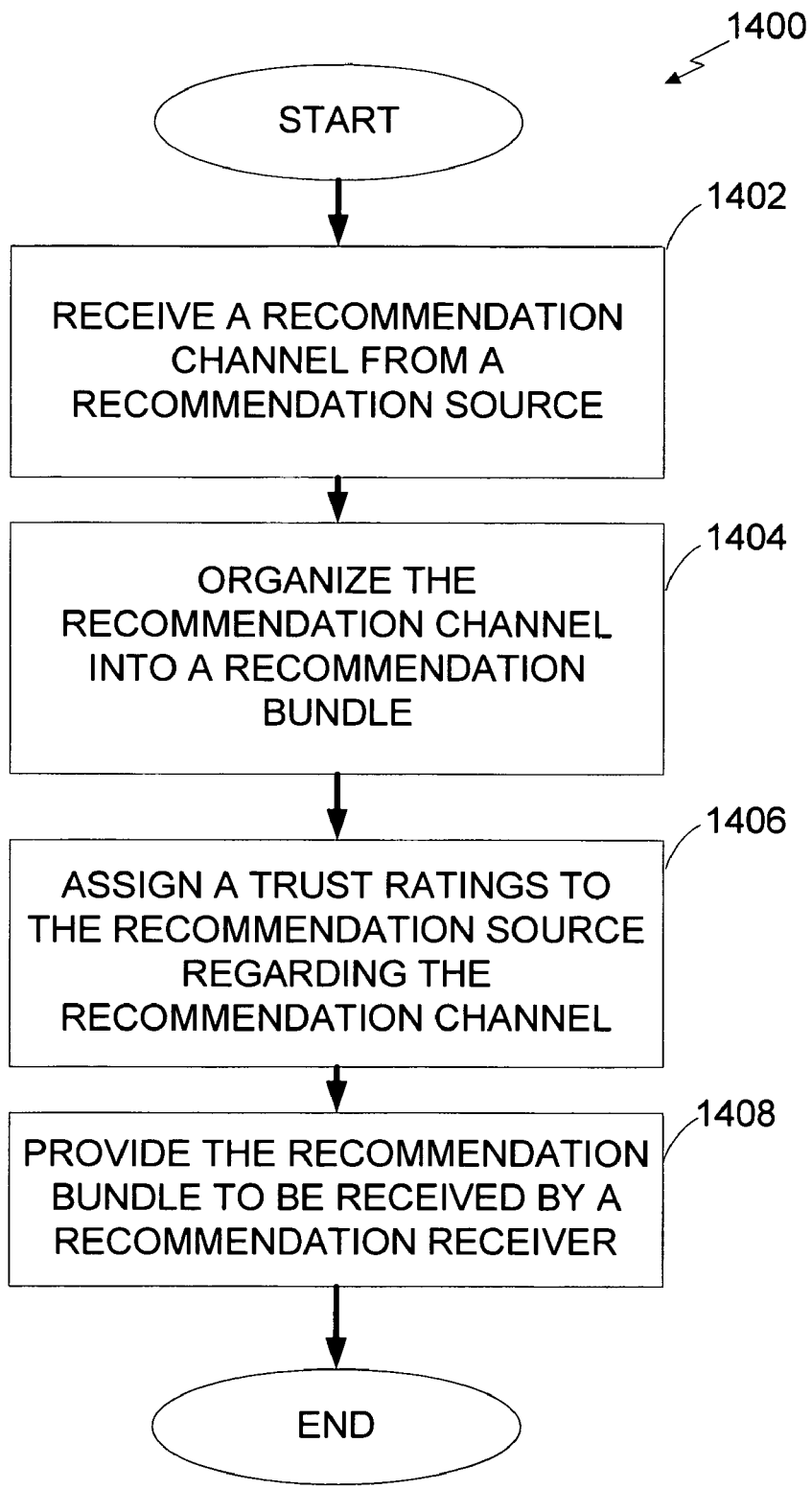
FIG. 14 is a flow diagram of another embodiment of a method 1400 for making and transmitting recommendations over a recommendation network.

FIG. 14 is a flow diagram of one embodiment of a method 1400 for making and transmitting recommendations over a recommendation network. Method 1400 begins, at processing block 1402, with receiving a recommendation channel form a recommendation source. The method 1400 continues, at processing block 1404, with organizing the recommendation channel into a recommendation source. Then, the method 1400 continues, at processing block 1406, with assigning a trust rating to the recommendation source regarding the recommendation channel. The method 1400 further continues, at processing bloc 1408, with providing the recommendation bundle to a recommendation receiver.

Figure 15:
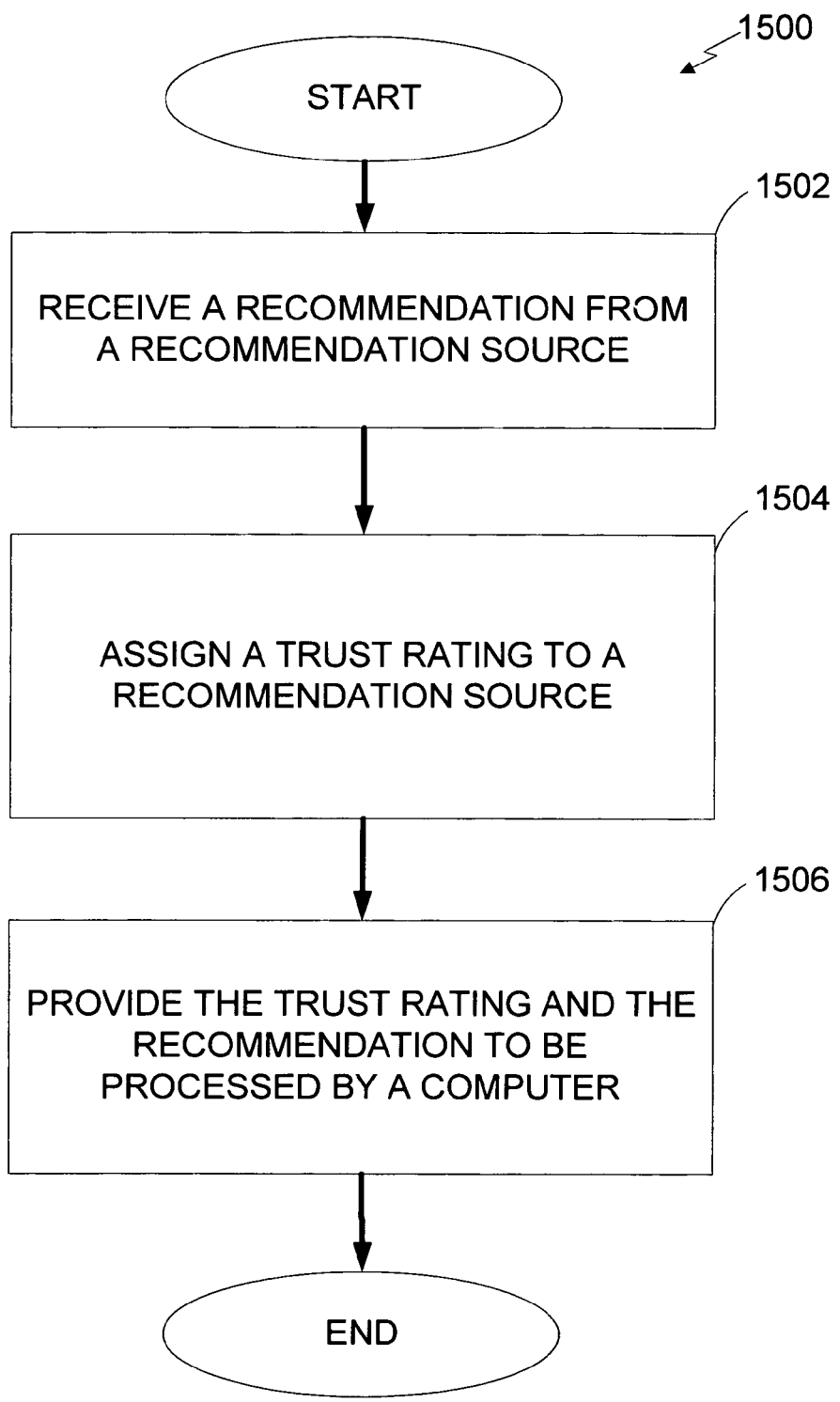
FIG. 15 is a flow diagram of another embodiment of a method 1500 for making and transmitting recommendations over a recommendation network.

FIG. 15 is a flow diagram of one embodiment of a method 1500 for making and transmitting recommendations over a recommendation network. Method 1500 begins, at processing block 1502, with receiving a recommendation. The recommendation may have been assigned a recommendation value rating or a temporality rating. The method 1500 continues, at processing block 1504, with assigning a trust rating to a recommendation source. Method 1500 then continues, at processing block 1506, with providing the trust rating and the recommendation, including any one of the recommendation value rating or the trust rating, to be processed by a computer.

Figure 16:
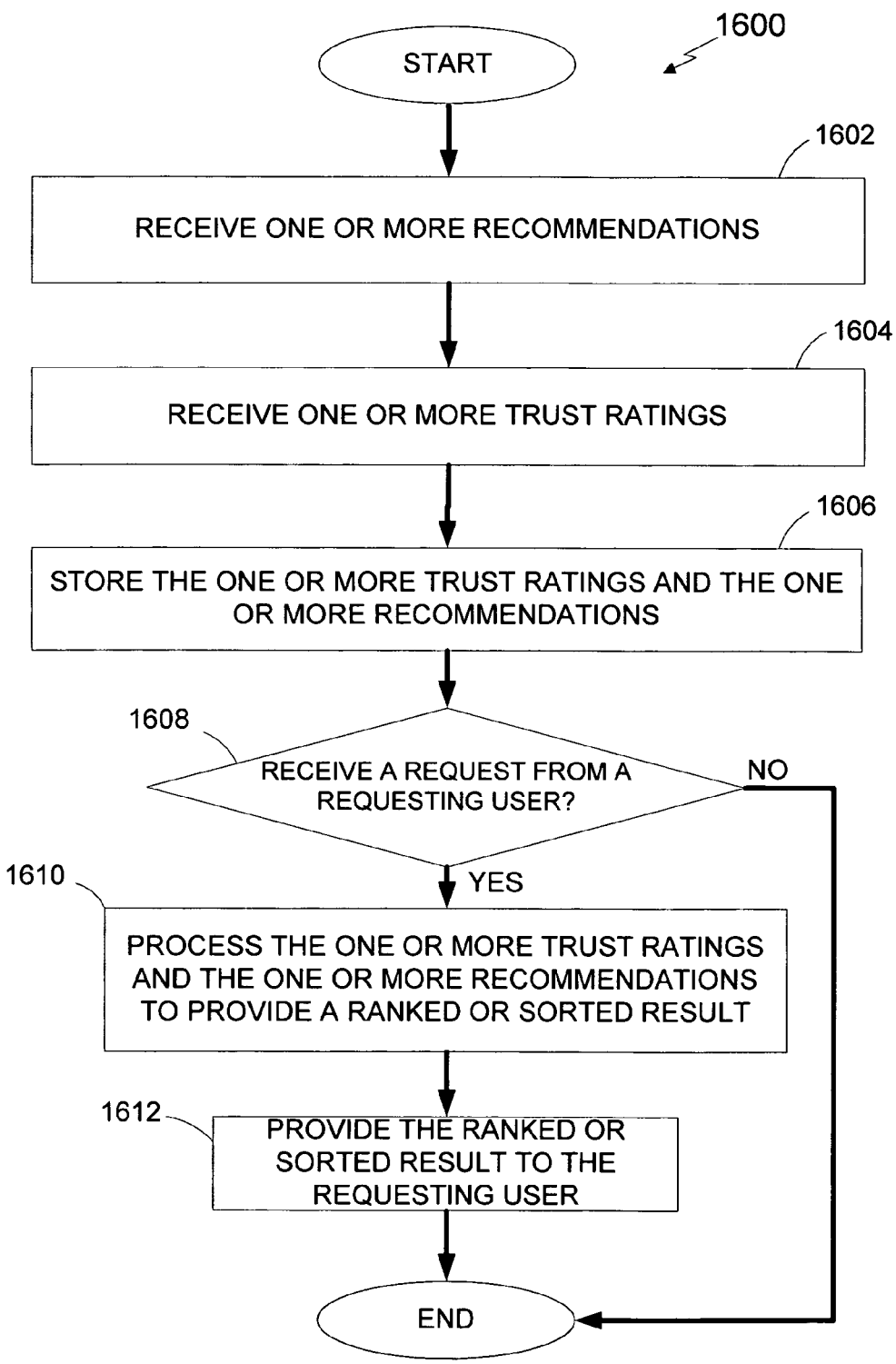
FIG. 16 is a flow diagram of another embodiment of a method 1600 for making and transmitting recommendations over a recommendation network.

FIG. 16 is a flow diagram of one embodiment of a method 1600 for making and transmitting recommendations over a recommendation network. Method 1600 begins, at processing block 1602, with receiving one or more recommendations, which may include one or more recommendation value ratings or one or more temporality ratings. Method 1600 then continues, at processing block 1604, with receiving one or more trust ratings. Method 1600 then continues, at processing block 1606, with storing the one or more trust ratings and the one or more recommendations. Method 1600 then continues, at processing block 1608, with receiving a request from a requesting user. If so, then method 1600 continues, at processing block 1610, with processing the one or more trust ratings and the one or more recommendations, which may include the one or more recommendation value ratings or temporality ratings, to provide a ranked or sorted result.

Method 1600 then continues, at processing block 16012 with providing the ranked or sorted result to the requesting user.

Several embodiments of the invention have thus been described. However, those ordinarily skilled in the art will recognize that the invention is not limited to the embodiments described, but can be practiced with modification and alteration within the spirit and scope of the appended claims that follow.

What is claimed:

1. A system, comprising:
   a server configured to
   assign a trust rating, in response to input from a user source, to a recommender source specifically for a topic, wherein the trust rating represents a degree of trust that the user source has in the recommender source to provide one or more content recommendations of value specifically for the topic, wherein the topic is specified by the input from the user source,
   determine a recommendation rating for a content recommendation from the one or more content recommendations provided by the recommender source, wherein the content recommendation is for content specified with the topic, and wherein the recommendation rating represents a degree of preference that the recommender source has for the content, and
   calculate a score for the content recommendation in response to computing the recommendation rating with the trust rating; and
   a client device configured to
   receive the input from the user source,
   provide the input to the server,
   receive the score from the server, and
   present the score on a display associated with the client device.

2. The system of claim 1, wherein the client device is further configured to
   present the score for the content recommendation as an entry on a ranked list.

3. The system of claim 1, wherein the server is further configured to
   generate, in response to additional input provided by the user source, a recommendation container configured to receive the content recommendation from the recommender source, wherein the recommender source is within a social network of the user source, and wherein the recommendation container is user definable by the user source,
   assign the topic to the recommendation container, wherein the topic is defined by the user source, and
   associate, via the additional input by the user source, the recommender source with the recommendation container.

4. The system of claim 3, wherein the server is further configured to
   receive an additional trust rating assigned specifically to the recommendation container, wherein the additional trust rating indicates an additional degree of trust that the user source has in the recommendation container, as an additional recommendation source, to provide recommendations of value on the topic, and
   calculate the score for the content recommendation by computing the recommendation rating with the trust rating and with the additional trust rating.

5. The system of claim 3, where the server is further configured to
   provide an instance of the recommendation container to an additional user source,
   channel the content recommendation into the instance of the recommendation container,
   determine an additional topic specified by additional user input from the additional user source,
   assign the additional topic to the instance of the recommendation container,
   receive an additional trust rating from the additional user source, wherein the additional trust rating indicates an additional degree of trust that the additional user source has in the recommendation container, as an additional recommendation source, to provide recommendations of value on the additional topic, and
   calculate an additional score for the content recommendation channeled into the recommendation container in response to computing the recommendation rating with the trust rating and with the additional trust rating.

6. The system of claim 1, where the server is further configured to
   receive a recommendation temporality rating, wherein the recommendation temporality rating indicates a user-defined, timeliness of relevance for the content recommendation, wherein the timeliness of the relevance is indicative of a perceived degree, by the user source, that the content is relevant over time,
   assign the recommendation temporality rating to content recommendation, and
   organize the content recommendation into a ranked list using the score and the recommendation temporality rating.

7. The system of claim 1, wherein the recommendation source represents a subset of social-network user entities linked to a website account for the user source.

8. A computer-implemented method, wherein one or more processors for a computer associated with a computerized social network perform operations comprising:
   assigning a trust rating, in response to input from a user source, to a recommender source specifically for a topic, wherein the trust rating represents a degree of trust that the user source has in the recommender source to provide content recommendations of value specifically for the topic, wherein the topic is specified by the input from the user source;
   determining a recommendation rating for a content recommendation provided by the recommender source, wherein the content recommendation is for content specified with the topic, and wherein the recommendation rating represents a degree of preference that the recommender source has for the content;
   calculating a score for the content recommendation in response to computing the recommendation rating with the trust rating; and
   ranking the content recommendation in a ranked list based on the score.

9. The computer-implemented method of claim 8 further comprising:
   presenting the score for the content recommendation as an entry on a ranked list of a website.

10. The computer-implemented method of claim 8, further comprising:
    generating, in response to additional input provided by a user source, a recommendation container configured to receive the content recommendation from the recommender source, wherein the recommender source is within a social network of the user source, and wherein the recommendation container is user definable by the user source;
    assigning the topic to the recommendation container; and associating, via the additional input by the user source, the recommender source with the recommendation container.

11. The computer-implemented method of claim 10, further comprising:
receiving an additional trust rating assigned specifically to the recommendation container, wherein the additional trust rating indicates an additional degree of trust that the user source has in the recommendation container, as an additional recommendation source, to provide recommendations of value on the topic; and
calculating the score for the content recommendation in response to computing the recommendation rating with the trust rating and with the additional trust rating.

12. The computer-implemented method of claim 10, further comprising:
providing an instance of the recommendation container to an additional user source;
channeling the content recommendation into the instance of the recommendation container;
determining an additional topic specified via additional user input from the additional user source;
assigning the additional topic to the instance of the recommendation container;
receiving an additional trust rating from the additional user source, wherein the additional trust rating indicates an additional degree of trust that the additional user source has in the recommendation container, as an additional recommendation source, to provide recommendations of value on the additional topic; and
calculating an additional score for the content recommendation channeled into the recommendation container in response to computing the recommendation rating with the trust rating and with the additional trust rating.

13. The computer-implemented method of claim 8, further comprising:
receiving a recommendation temporality rating, wherein the recommendation temporality rating indicates a user-defined, timeliness of relevance for the content recommendation, wherein the timeliness of the relevance is indicative of a perceived degree, by the user source, that the content is relevant over time;
assigning the recommendation temporality rating to content recommendation; and
organizing the content recommendation into a ranked list using the score and the recommendation temporality rating.

14. The computer-implemented method of claim 8 further comprising:
sorting the content recommendation based on the topic.

15. One or more computer readable storage media having instructions stored thereon, which when executed by a set of one or more processors causes the set of one or more processors to perform operations comprising:
assigning a trust rating, in response to input from a user source, to a recommender source specifically for a topic, wherein the trust rating represents a degree of trust that the user source has in the recommender source to provide content recommendations of value specifically for the topic, wherein the topic is indicated via the input from the user source;
determining a recommendation rating for a content recommendation provided by the recommender source, wherein the content recommendation is for content specified with the topic, and wherein the recommendation rating represents a degree of preference that the recommender source has for the content; and
calculating a score for the content recommendation in response to computing the recommendation rating with the trust rating;
receiving a search query by an additional user source for one or more key terms from the defined topic; and
ranking the content recommendation in a ranked list, based on the score, in response to the search query.

16. The one or more computer readable storage media of claim 15, the operations further comprising:
determining a topic description assigned by the recommender source to the content recommendation;
determining that the topic description matches the topic; and
ranking the content recommendation in a ranked list in part in response to determining the that the topic description matches the topic.

17. The one or more computer readable storage media of claim 15, the operations further comprising:
generating, in response to additional input provided by a user source, a recommendation container configured to receive the content recommendation from the recommender source, wherein the recommender source is within a social network of the user source, and wherein the recommendation container is user definable by the user source;
assigning the topic to the recommendation container; and
associating, via the additional input by the user source, the recommender source with the recommendation container.

18. The one or more computer readable storage media of claim 17, the operations further comprising:
receiving an additional trust rating assigned specifically to the recommendation container, wherein the additional trust rating indicates an additional degree of trust that the user source has in the recommendation container, as an additional recommendation source, to provide recommendations of value on the topic; and
calculating the score for the content recommendation in response to computing the recommendation rating with the trust rating and with the additional trust rating.

19. The one or more computer readable storage media of claim 17, the operations further comprising:
providing an instance of the recommendation container to an additional user source;
channeling the content recommendation into the instance of the recommendation container;
determining an additional topic indicated by the additional user source;
assigning the additional topic to the instance of the recommendation container;
receiving an additional trust rating from the additional user source, wherein the additional trust rating indicates an additional degree of trust that the additional user source has in the recommendation container, as an additional recommendation source, to provide recommendations of value on the additional topic; and
calculating an additional score for the content recommendation channeled into the recommendation container in response to computing the recommendation rating with the trust rating and with the additional trust rating.

20. The one or more computer readable storage media of claim 15, the operations further comprising:
filtering the ranked list based on the topic.

* * * * *